(12) United States Patent
Wilson et al.

(10) Patent No.: US 12,117,867 B2
(45) Date of Patent: Oct. 15, 2024

(54) BUTTERFLY DIVIDER SCREEN

(71) Applicant: PAIR, LLC, San Francisco, CA (US)

(72) Inventors: Brian Wilson, Berkeley, CA (US); Elliot Whalen, San Francisco, CA (US); Benjamin Edmund Hopkins, Austin, TX (US); Erik Ruzich, Meridian, ID (US)

(73) Assignee: PAIR, LLC, San Francisco, CA (US)

( * ) Notice: Subject to any disclaimer, the term of this patent is extended or adjusted under 35 U.S.C. 154(b) by 554 days.

(21) Appl. No.: 17/321,954

(22) Filed: May 17, 2021

(65) Prior Publication Data

US 2021/0386201 A1 Dec. 16, 2021

Related U.S. Application Data

(60) Provisional application No. 63/039,064, filed on Jun. 15, 2020.

(51) Int. Cl.
*A47B 97/00* (2006.01)
*G06F 1/16* (2006.01)
*G06F 11/36* (2006.01)
*G06F 18/22* (2023.01)
*G06T 7/00* (2017.01)

(52) U.S. Cl.
CPC ............ *G06F 1/1601* (2013.01); *A47B 97/00* (2013.01); *G06F 11/366* (2013.01); *G06F 18/22* (2023.01); *G06T 7/001* (2013.01); *G06T 2200/24* (2013.01); *G06T 2207/30168* (2013.01)

(58) Field of Classification Search
CPC ....... A47B 97/00; E04C 2/409; E05D 7/0018; G09F 15/0068; G07F 19/201
USPC .............................................. 52/36.1, 65, 71
See application file for complete search history.

(56) References Cited

U.S. PATENT DOCUMENTS

| | | | | | |
|---|---|---|---|---|---|
| 2,255,529 | A | * | 9/1941 | May | E05D 7/0054 16/274 |
| 2,311,951 | A | * | 2/1943 | Marshall | E04B 2/7453 52/354 |
| 2,748,420 | A | * | 6/1956 | Wilkendorf | E05D 7/02 16/265 |
| 3,809,142 | A | * | 5/1974 | Bleeker | E04B 2/7444 160/135 |
| 4,129,163 | A | * | 12/1978 | Johnson | E04B 2/7427 52/239 |
| 4,221,086 | A | * | 9/1980 | Berman | G07F 19/201 902/31 |

(Continued)

*Primary Examiner* — Beth A Stephan
(74) *Attorney, Agent, or Firm* — Womble Bond Dickinson (US) LLP

(57) ABSTRACT

A divider screen is described in various embodiments having various numbers of screens and screen members, and various arrangements. One divider screen has a post, a first screen member and a second screen member. The first screen member has a first screen attached to a first rotation member. The first rotation member is rotatably located to the post with the first screen member rotatable about the post. The second screen member has a second screen attached to a second rotation member. The second rotation member is rotatably located to the post with the second screen member rotatable about the post. The first and second screen members are arrangeable in at least a closed 0° position, an open 90° position, and an open 180° position.

14 Claims, 24 Drawing Sheets

(56) References Cited

U.S. PATENT DOCUMENTS

| | | | | |
|---|---|---|---|---|
| 4,288,937 | A * | 9/1981 | Virsen | F16B 7/048 |
| | | | | 40/607.1 |
| 6,116,326 | A * | 9/2000 | Domina | E04B 2/7422 |
| | | | | 160/351 |
| 6,123,321 | A * | 9/2000 | Miller | A47D 13/065 |
| | | | | 256/25 |
| 7,373,746 | B1 * | 5/2008 | Pettesch | G09F 7/18 |
| | | | | 40/605 |
| 8,082,971 | B1 * | 12/2011 | Peterson | E04B 2/7427 |
| | | | | 40/606.16 |
| 10,154,611 | B2 * | 12/2018 | Ross | H05K 7/20745 |
| 11,047,130 | B2 * | 6/2021 | Ramirez | E04B 2/7442 |
| 11,583,111 | B2 * | 2/2023 | Weinstein | A47F 5/0031 |
| 2006/0156512 | A1 * | 7/2006 | Naylor | E05D 5/128 |
| | | | | 16/273 |
| 2010/0018095 | A1 * | 1/2010 | Molla | G09F 17/00 |
| | | | | 40/606.01 |
| 2014/0150345 | A1 * | 6/2014 | Price | E05D 3/022 |
| | | | | 16/221 |

* cited by examiner

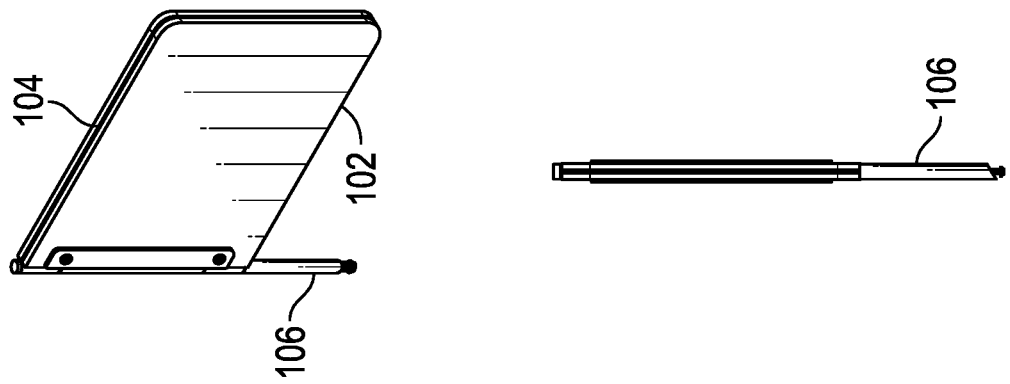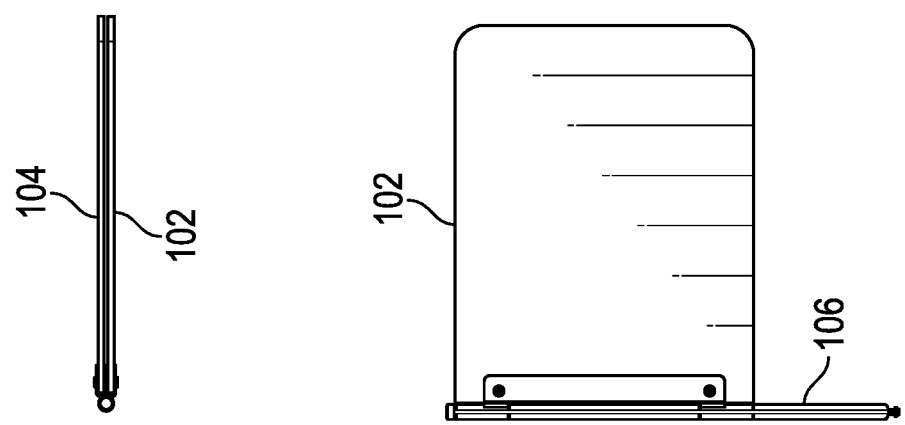
FIG. 1

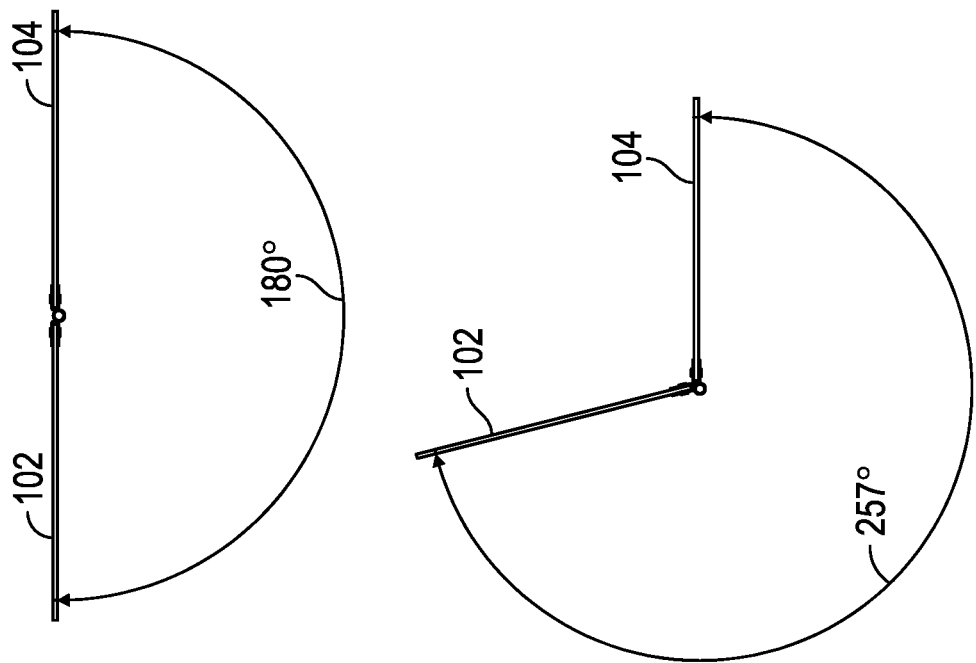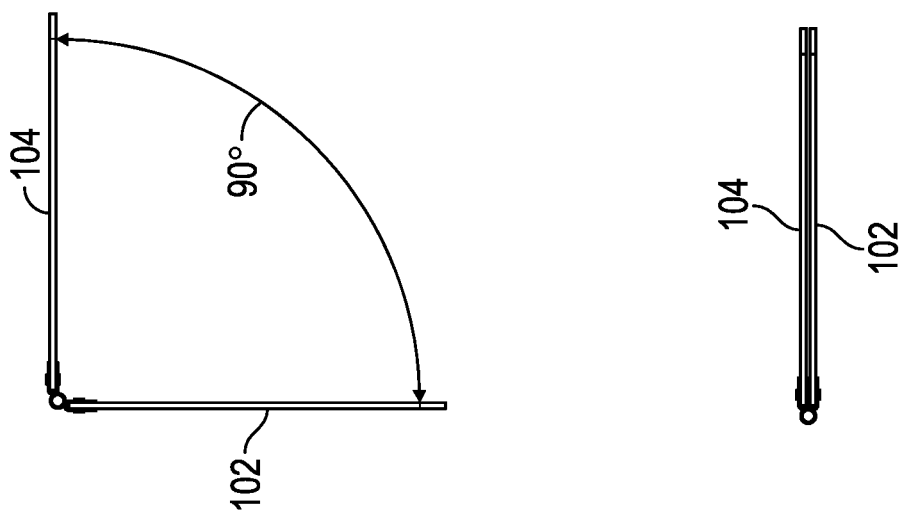
FIG. 2

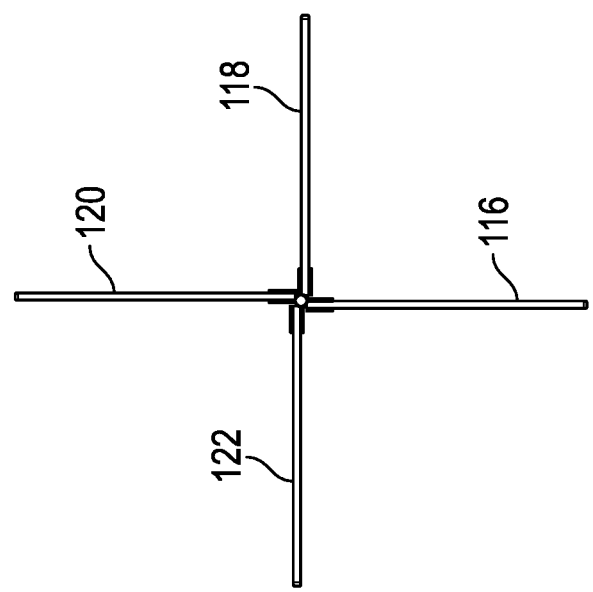
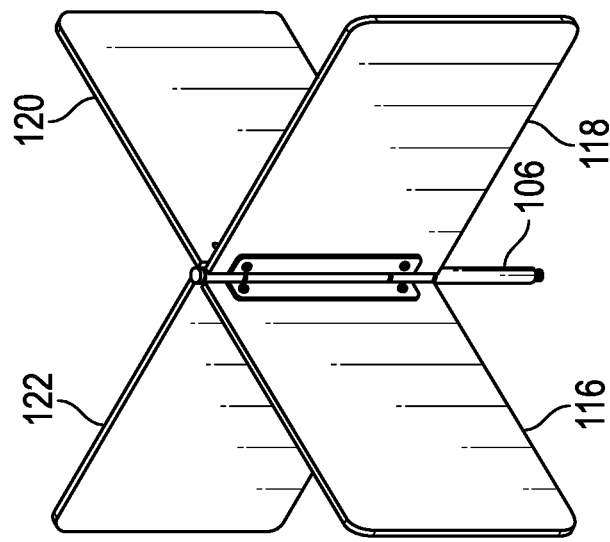
FIG. 8

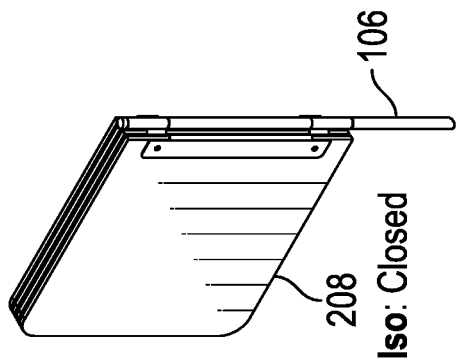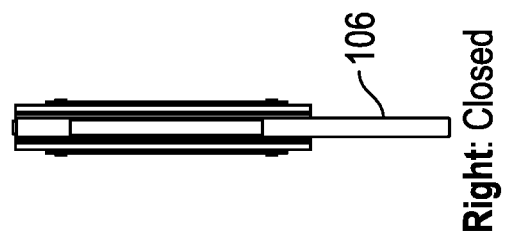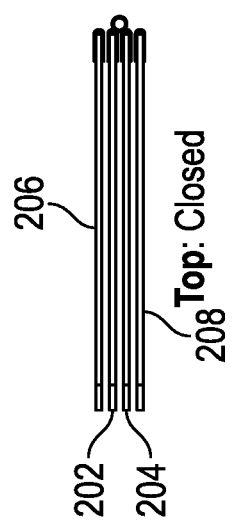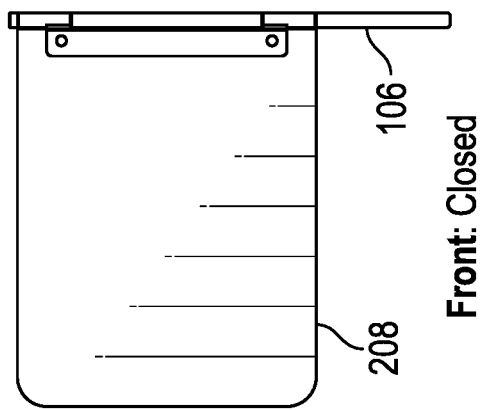
FIG. 17

Dividers Attached to 4way Butterfly Hinge

BUTTERFLY DIVIDER SCREEN

This application claims benefit of priority from U.S. Provisional Application No. 63/039,064, filed Jun. 15, 2020, which is hereby incorporated by reference.

TECHNICAL FIELD

The present disclosure relates to furniture, and more specifically privacy or divider screens.

BACKGROUND

Divider screens, or privacy screens as they are sometimes called, have been in use in various cultures worldwide for many centuries. Some divider screens are folding screens, or foldable screens, and feature two or more screens or panels connected together with hinges. Divider screens can be mounted with hinges to a wall, to fold out from the wall. Generally, a divider screen is deployed as a portable, movable, positionable, temporary wall or barrier that subdivides a working, domestic or personal space, which can be indoors, for example a room or part of a room, or outdoors. A divider screen may be plain, styled, or adorned with art or ornamentation, and may be made of various materials such as cloth, wood, metal, plastic, etc., with or without a frame. Today's working and living environments are changing towards more flexible spaces that are personally or situationally defined. It is in this context that present embodiments arise.

SUMMARY

A divider screen is described in various embodiments having various numbers of screens and screen members, and various arrangements.

One embodiment is a divider screen that has a post, a first screen member and a second screen member. The first screen member has a first screen attached to a first rotation member. The first rotation member is rotatably located to the post with the first screen member rotatable about the post. The second screen member has a second screen attached to a second rotation member. The second rotation member is rotatably located to the post with the second screen member rotatable about the post. The first and second screen members are arrangeable in at least a closed 0° position, an open 90° position, and an open 180° position.

One embodiment is a divider screen that has a post, a first screen member and a second screen member. The first screen member has a first screen, a second screen and a first rotation member. The first and second screens are attached to the first rotation member. The first rotation member is rotatably located to the post. The first screen member and the second screen member, in opposed parallel arrangement to each other, are rotatable about the post. The second screen member has a third screen, a fourth screen and a second rotation member. The third and fourth screens are attached to the second rotation member. The second rotation member is rotatably located to the post. The third screen and the fourth screen in opposed parallel arrangement to each other are rotatable about the post. The first and second screen members are arrangeable in at least a closed 0° position, an open 90° position, and a symmetric orthogonal arrangement. In the closed 0° position, the first and third screens are in closed together parallel arrangement, and the second and fourth screens are in closed together parallel arrangement. In the open 90° position, the first, third, second and fourth screens are in symmetric, orthogonal arrangement. The first screen member and the second screen member orthogonal to each other.

One embodiment is a divider screen that has a post, a first screen member and multiple further screen members. The first screen member has a first screen attached to a first rotation member. The first rotation member is rotatably located to the post such that the first screen member is rotatable about the post. Each further screen member has a further screen attached to a further rotation member. The further rotation member is rotatably located to the post such that the further screen member is rotatable about the post. The screen members are arrangeable in at least a closed 0° position, a first open position, and a second open position. In the closed 0° position, all of the screen members are in closed together parallel arrangement. In the first open position, all of the screen members are in an open, symmetric arrangement. In the second open position, all of the screen members are in an open, asymmetric arrangement.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIGS. 1-27 depict various views and embodiments of a butterfly divider screen device and system, according to various implementations.

FIG. 1 depicts an embodiment of a butterfly divider screen that has two screen members rotatable about a post.

FIG. 2 depicts some of the arrangements of the two screen members, in a top view of an embodiment.

FIG. 3 further depicts arrangements of the two screen members.

FIG. 4 illustrates a beam with legs, supporting an embodiment of the butterfly divider screen with the post mounted to the beam.

FIG. 5 further illustrates the beam and embodiment of the butterfly divider screen, in an assembled view.

FIG. 6 depicts an embodiment of the butterfly divider screen that has a base to which the post is mounted.

FIG. 7 is a side view of the butterfly divider screen mounted to a base.

FIG. 8 depicts an embodiment of a butterfly divider screen that has four screen members rotatable about a post.

FIG. 9 depicts components suitable for an embodiment of a butterfly divider screen, with details of a first rotation member, a second rotation member, and a multiple section post.

FIG. 10 depicts the first rotation member and the second rotation member assembled to each other, ready to assemble to the post.

FIG. 11 depicts the first rotation member, the second rotation member and the post as an assembled butterfly hinge ready to receive a fastener.

FIG. 12 depicts the assembled butterfly hinge, with the fastener securing the first rotation member and the second rotation member to the post.

FIG. 13 depicts the assembled butterfly hinge ready to receive a first screen and a second screen.

FIG. 14 depicts the screens assembled to the butterfly hinge, ready to receive fasteners.

FIG. 15 depicts one embodiment of an assembled butterfly divider screen.

FIG. 16 depicts an embodiment of a butterfly divider screen that has four screens, a main hinge and two secondary hinges.

FIG. 17 depicts the four screen butterfly divider screen of FIG. 16 in a folded, zero degree position or arrangement.

FIG. 18 depicts the four screen butterfly divider screen of FIG. 16 in an open, four-screen symmetric ninety degree or orthogonal position or arrangement.

FIG. 19 depicts the four screen butterfly divider screen of FIG. 16 in an open, T-shaped position or arrangement.

FIG. 20 depicts the four screen butterfly divider screen of FIG. 16 in an open, one hundred and eighty degree position or arrangement.

FIG. 21 depicts the four screen butterfly divider screen of FIG. 16 in an open, two-screen ninety degree or orthogonal position or arrangement.

FIG. 22 sets forth an embodiment of a two screen butterfly divider screen based on FIGS. 1-15, showing multiple positions or arrangements.

FIG. 23 illustrates an exploded view and assembled views in multiple positions or arrangements of the butterfly hinge of FIG. 22.

FIG. 24 depicts a further embodiment of a four screen butterfly divider screen, with screens or dividers attached to a four-way butterfly hinge, in multiple positions or arrangements.

FIG. 25 illustrates an exploded view and assembled views of the four-way butterfly hinge of FIGS. 23 and 24 in multiple positions or arrangements.

FIG. 26 depicts a screen that has a monitor, suitable for embodiments of butterfly divider screens.

FIG. 27 depicts an embodiment of a butterfly divider screen with a motor or actuator that is coupled to move screen members.

DETAILED DESCRIPTION

Figure 3:
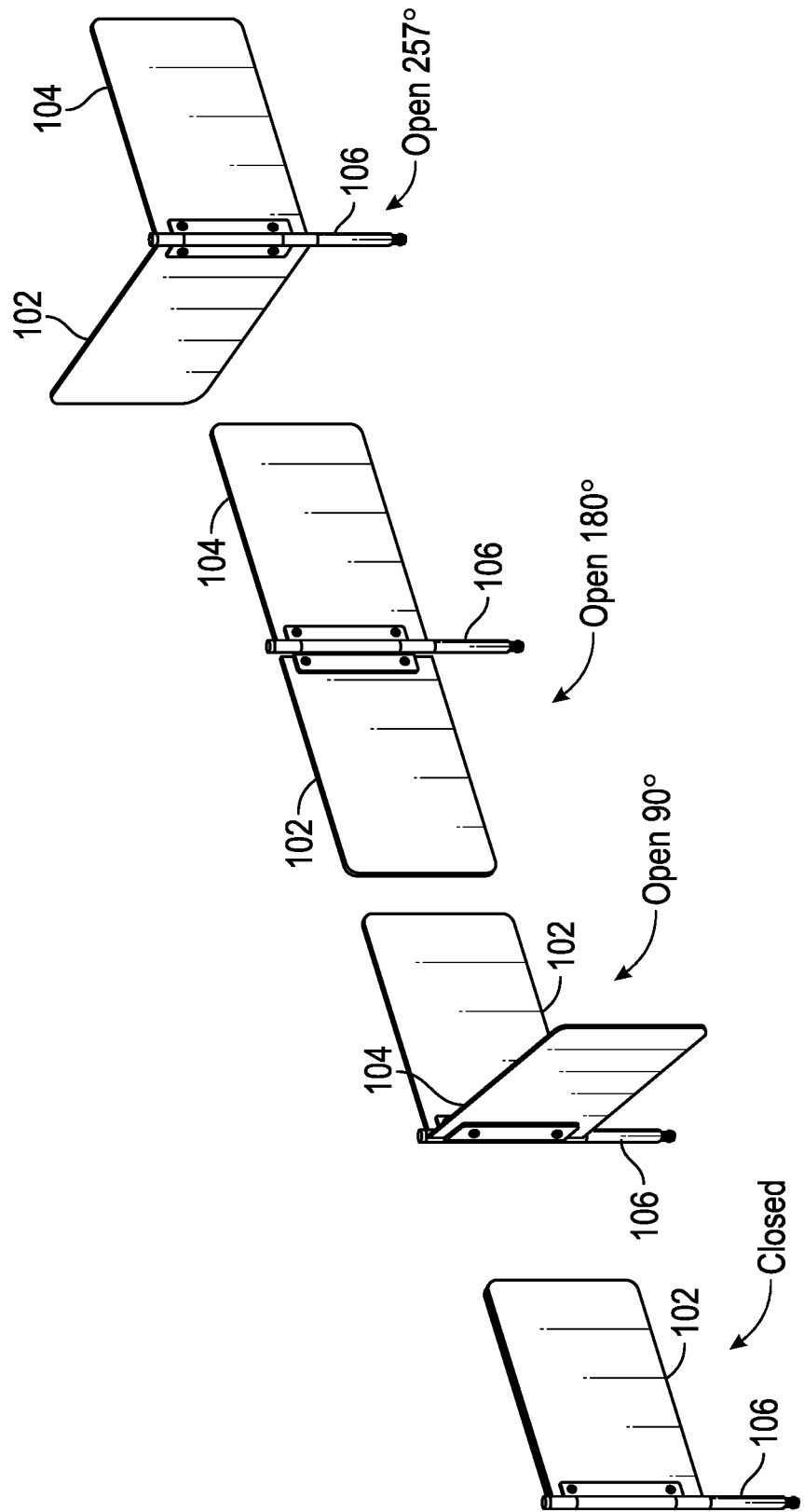

A functional furniture device and system (e.g., "butterfly divider screen") is described herein, with specific reference to FIGS. 1-27. In one embodiment, a butterfly divider screen is a functional screen, a user controlled screen and enclosure intended for an office setting. The screen may pivot around a central column thus allowing a user to spin the screen to block or enclose the user at the vantage point of their choosing. Importantly, although discussion herein refers to a single screen for brevity, any number of screens may be affixed to a central column, thus allowing for a variety of privacy configurations. In various embodiments, the column to which the one or more screens are attached can range in height, from a sitting height to a standing height, and the screen extends outward to provide the desired level of privacy.

In one embodiment, the column attaches to a furniture system as its base. The column is fashioned to attach to any suitable brand and variety of systems of furniture. In one embodiment including two screens on a central column, the two screens may open and swing a full 180 degrees and can also be folded together, collapsed, or opened at will. In one alternative embodiment, four screens can be attached to the column to offer a full enclosure with all screens extending out at 90 degrees. The screens and column may be constructed of any suitable material, for example but not limited to textiles, metal, plastic (e.g., acrylic, polyethylene terephthalate (PET), etc.), wood, or any other material. Detailed illustrations of a variety of illustrative embodiments are provided with respect to FIGS. 1-27.

FIG. 1 depicts an embodiment of a butterfly divider screen that has two screen members 102, 104 rotatable about a post 106. This embodiment can be termed a two-screen butterfly divider screen, which has two screens attached to a butterfly hinge, about which further details are described below. Each screen member 102, 104 may be independently rotatable completely about the post 106, i.e., has 360° rotation capability relative to the post 106. Each screen member 102, 104 is rotatably coupled to the post, for example by respective rotation members. Examples of components including rotation members, posts, screens and fastening mechanisms, along with assemblies, positions and arrangements of screen members 102, 104 for this and further embodiments are described below. Various further embodiments can be implemented with various types of hinges, various types and numbers of screens arrangeable in symmetric and asymmetric positions, various supports or support mechanisms, and various operation mechanisms.

FIG. 2 depicts some of the arrangements of the two screen members 102, 104, in a top view of an embodiment. At the top left in FIG. 2, one screen member 102 is arranged at right angles or 90°, orthogonal to the other screen member 104. At the top right in FIG. 2, one screen member 102 is opened one half way around the circle relative to the other screen member 104, in a 180° open arrangement. At the bottom left in FIG. 2, the two screen members 102, 104 are in closed, 0° arrangement, i.e. the two screen members 102, 104 closed together. At the bottom right in FIG. 2, the two screen members 102, 104 are in an open greater than 180° arrangement, i.e., one screen member 102 has been opened (e.g., from the closed arrangement) more than halfway around the circle from the other screen member 104.

FIG. 3 further depicts arrangements of the two screen members 102, 104. From left to right in FIG. 3, the two screen members 102, 104 are in closed, 0° arrangement, open, 90° arrangement, open, 180° arrangement, and open 257° arrangement. It should be appreciated that, although each screen member 102, 104 can be independently rotated completely around the circle, i.e., around the post 106, in embodiments, the two screen members 102, 104 may be limited as to maximum opened angle between the two screen members 102, 104, by mechanical interference. For example, the open 257° arrangement may be the maximum angle to which the two screen members 102, 104 can be rotated relative to each other, and further embodiments may have other maximum opening angle(s).

Figure 4:
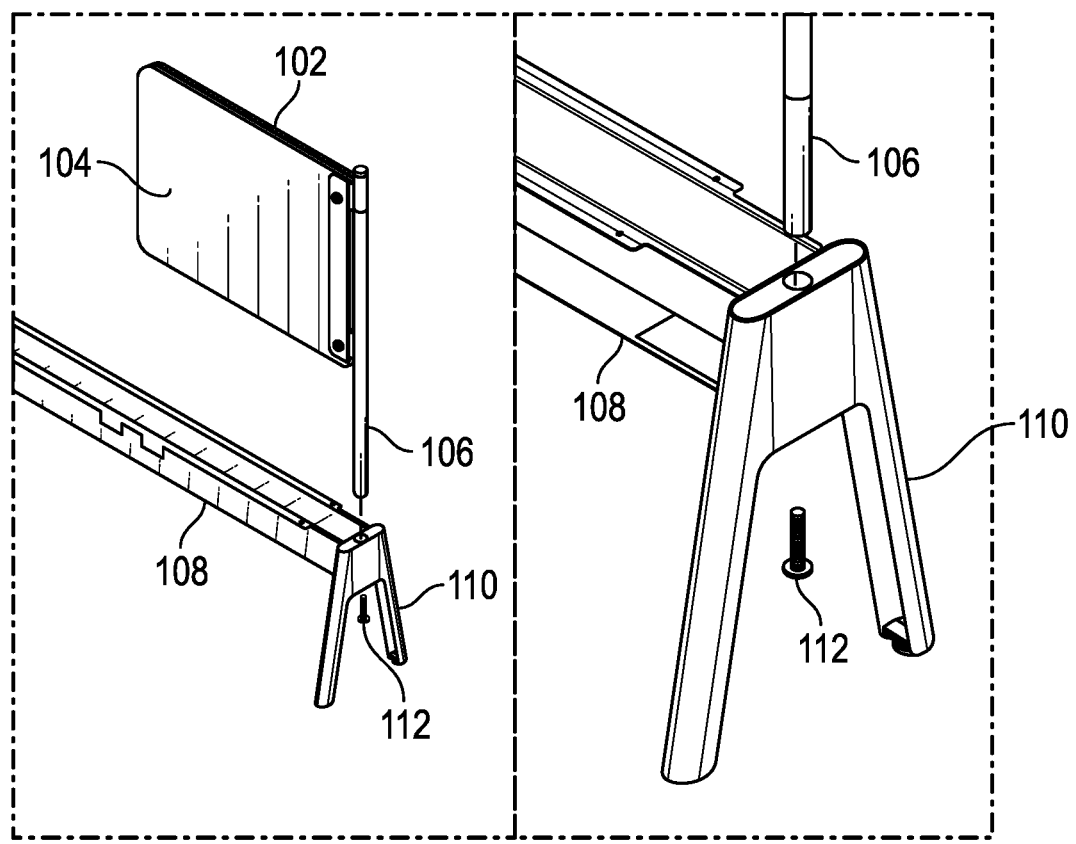

FIG. 4 illustrates a beam 108 with legs 110, supporting an embodiment of the butterfly divider screen with the post 106 coupled to the beam. Alternatively, it can be considered the butterfly divider screen is mounted to the legs 110. In either case, the butterfly divider screen has a support, in this and further embodiments. A fastener 112, for example a bolt or a screw, is shown ready to secure the post 106 to the beam 108 (see also FIG. 5). The screen members 102, 104 can be positioned relative to each other as shown in FIG. 3, and this relative positioning of screen members 102, 104 can be rotated laterally around the circle about the post 106, to maximize versatility of screen arrangement. In some embodiments, the beam 108 has electrical wiring for power distribution, for example to electrical or electronic devices that plug in to electrical sockets on the beam 108 and/or for power supply to a motor or actuator (see FIG. 27) or monitor (see FIG. 26). In a further embodiment, the beam 108 may be attached to other furniture, a floor, a wall, or suspended from the ceiling, in either semi-permanently or in movable arrangement. The portable version of the beam 108 with legs 110 may allow for positioning anywhere in an indoor or outdoor environment, to deploy the butterfly divider screen as desired.

Figure 5:
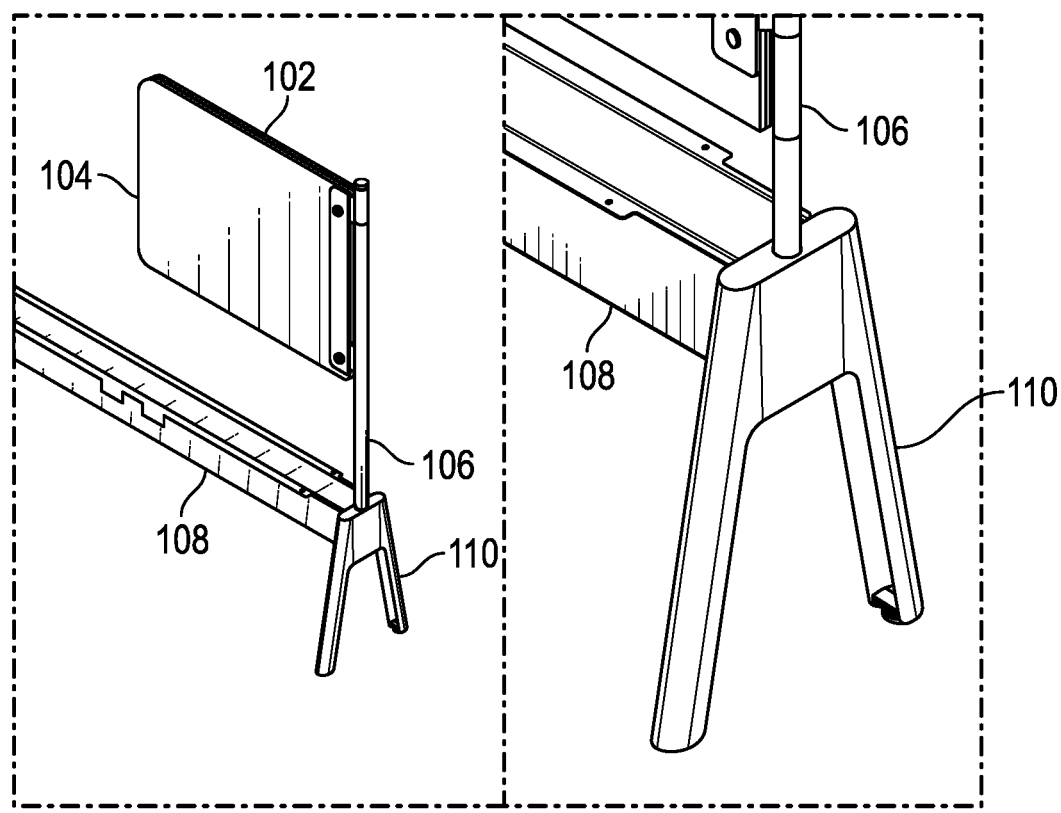

FIG. 5 further illustrates the beam and embodiment of the butterfly divider screen, in an assembled view. The fastener (not shown) secures the post 106 and the butterfly divider screen with two screen members 102, 104 to the beam 108 and/or the legs 110, i.e., to the support. Further ways and mechanisms to secure the post 106 are readily devised. This support and variations thereof are available for further embodiments of butterfly divider screens.

Figure 6:
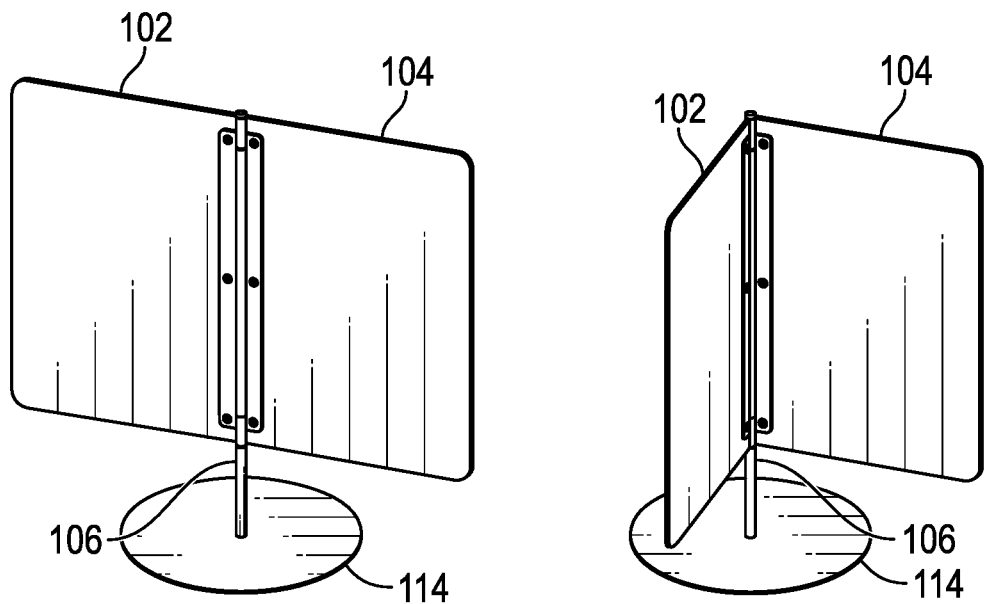

FIG. 6 depicts an embodiment of the butterfly divider screen that has a base 114 to which the post 106 is mounted. For example, the post 106 could be attached to the base 114 with the fastener 112 similarly to depiction in FIGS. 4 and 5. Various shapes, with or without projections such as feet, and various materials, are possible for the base 114. The butterfly divider screen, with screen members 102, 104, mounted to the base 114 and in various arrangements, is readily positionable in indoor and outdoor environments and rearranged therein.

Figure 7:
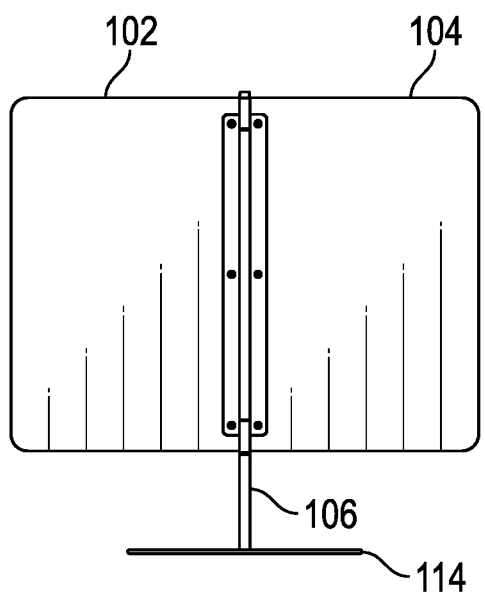

FIG. 7 is a side view of the butterfly divider screen mounted to a base 114. The screen members 102, 104 are in an open, 180° arrangement about the post 106. The post 106 is attached to the base 114, to support the butterfly divider screen. Dimensions are given for one embodiment. Larger and smaller, taller and shorter screens, extensible screens, or any combination thereof, are readily devised for various embodiments.

FIG. 8 depicts an embodiment of a butterfly divider screen that has four screen members 116, 118, 120, 122 rotatable about a post 106. The screen members 116, 118, 120, 122 are shown in four-screen symmetric orthogonal arrangement, i.e., with each screen member opposed to another screen member and orthogonal to two more screen members, arranged symmetrically about the post 106. The entire arrangement of screen members 116, 118, 120, 122 is completely rotatable about the post 106, and can be arranged with other angles between each pair of screen members. Further embodiments may include other numbers of screens, including three screens, five screens, six screens, seven screens, eight screens or more. Variations of the butterfly hinge herein described (see, e.g., FIGS. 9-12) are suitable for such embodiments of a butterfly divider screen.

Figure 9:
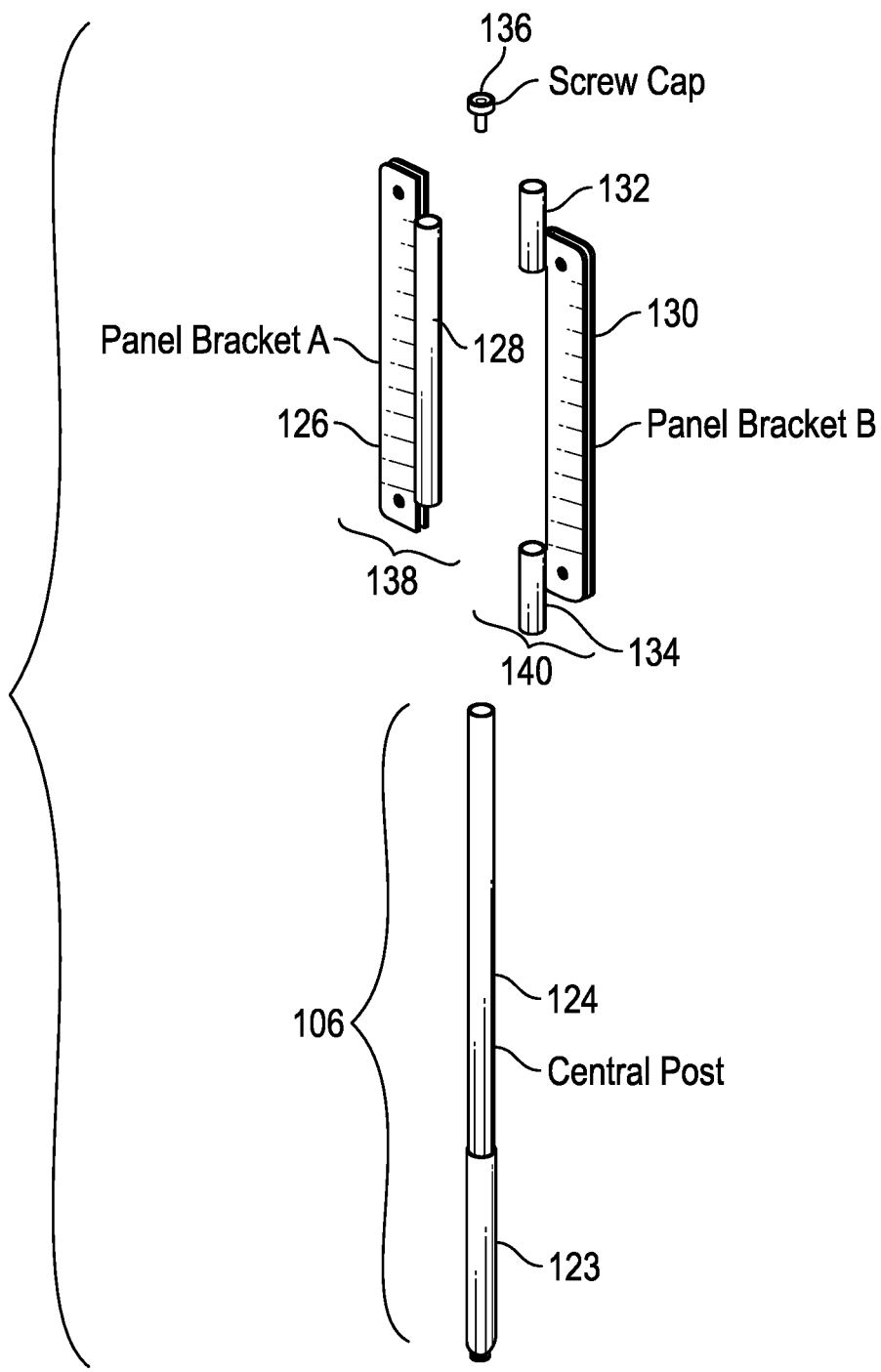

FIG. 9 depicts components suitable for an embodiment of a butterfly divider screen, which includes a first rotation member 138, a second rotation member 140, and a multiple section post 106. A lower post section 123 includes a tube, cylinder, or solid rod, of a specified diameter that is sufficiently large to retain the rotation members while preventing a rotation member from sliding further downward on the post 106 than the middle post section 124. A middle (or upper) post section 124 includes a tube, cylinder, or solid rod, of a smaller, specified diameter that allows sliding for assembly, and rotation of the first rotation member 138 and the second rotation member 140 about the post 106. The post 106 is thus made up of the larger diameter lower post section 123 and the smaller diameter middle (or upper) post section 124, which may be welded together, cast or machined as a single piece, extruded, or produced through further processes and materials.

The first rotation member 138 includes a bracket 126 connected to a middle tube 128, which could alternatively be a U-shaped cross section member, or other piece that supports rotation about the post 106 in conjunction with the bracket 126. The second rotation member 140 includes a bracket 130 connected to a lower tube 134 and upper tube 132, each of which could alternatively be a U-shaped cross section member, or other piece that supports rotation about the post 106 in conjunction with the bracket 130. In this embodiment, the lower tube 134 and upper tube 132 of the second rotation member 140 cooperatively fit to opposed ends of the middle tube 128 of the first rotation member 138 (see FIG. 10), allowing mutual arrangement and rotation about the post 106. A fastener 136 is shown in exploded view with the first rotation member 138, second rotation member 140 and the post 106, ready for assembly.

Further embodiments of rotation members may utilize other numbers of tubes or U-shaped cross section members, or more rotation members fitting together to support more screens in rotation about a post. Further embodiments of rotation members may utilize other types of rotation devices, such as rings, fingers, bearings, and various types of hinges. Further devices for retaining rotation members or screen members to a post or other member may be utilized.

Figure 10:
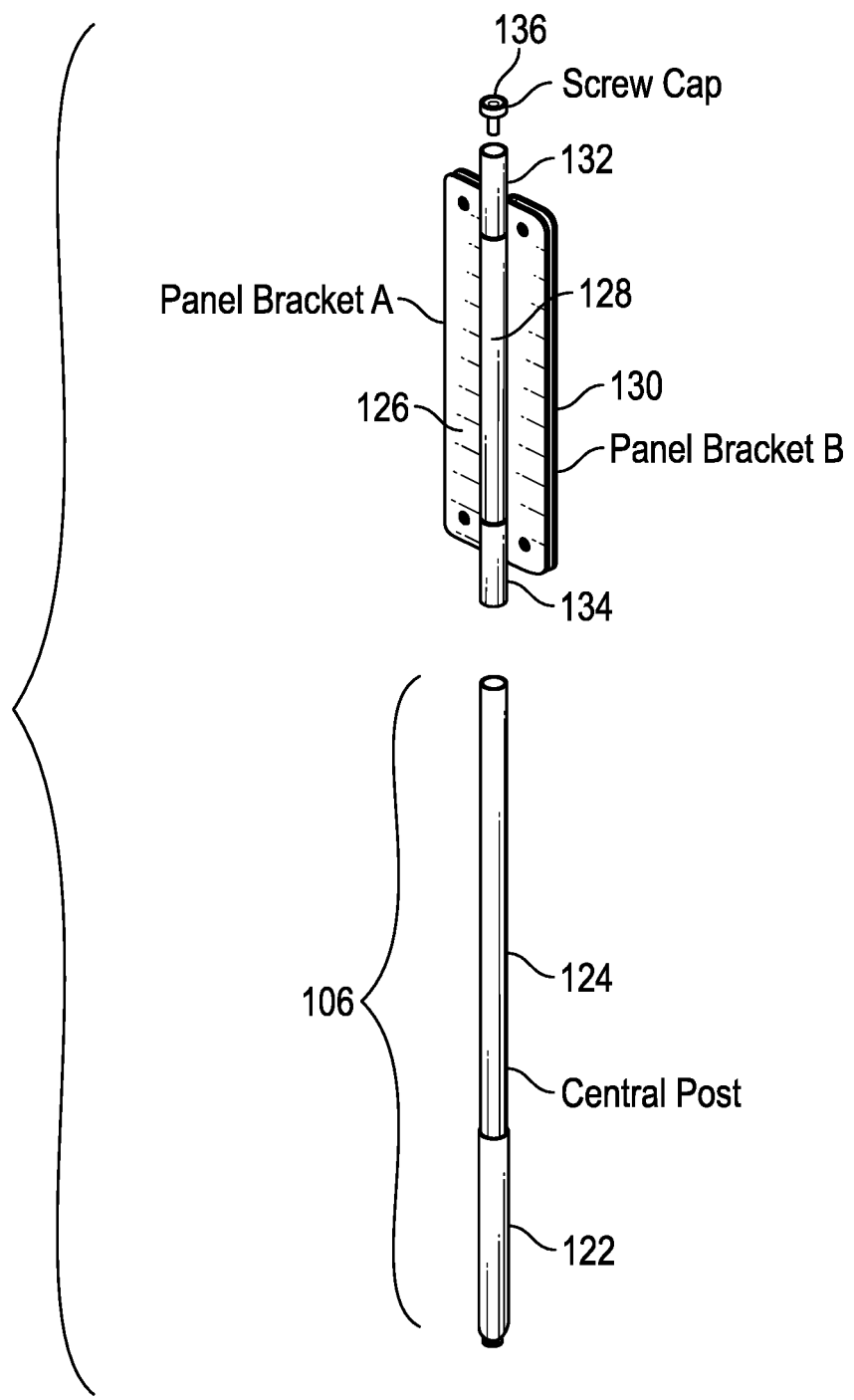

FIG. 10 depicts the first rotation member and the second rotation member assembled to each other, ready to assemble to the post 106. Although shown in open 180° arrangement, the bracket 126 and the bracket 130 could be at other angles relative to each other for the assembly procedure, in which the lower tube 134, middle tube 128 and upper tube 132 are slid onto the middle (or upper) post section 124 of the post 106. The lower post section 123 prevents further movement of these tubes or other portions of the rotation members, and along with the fastener 136 secures the tubes 134, 128, 132 and thus the first rotation member and second rotation member in a rotatable manner to the post 106.

Figure 11:
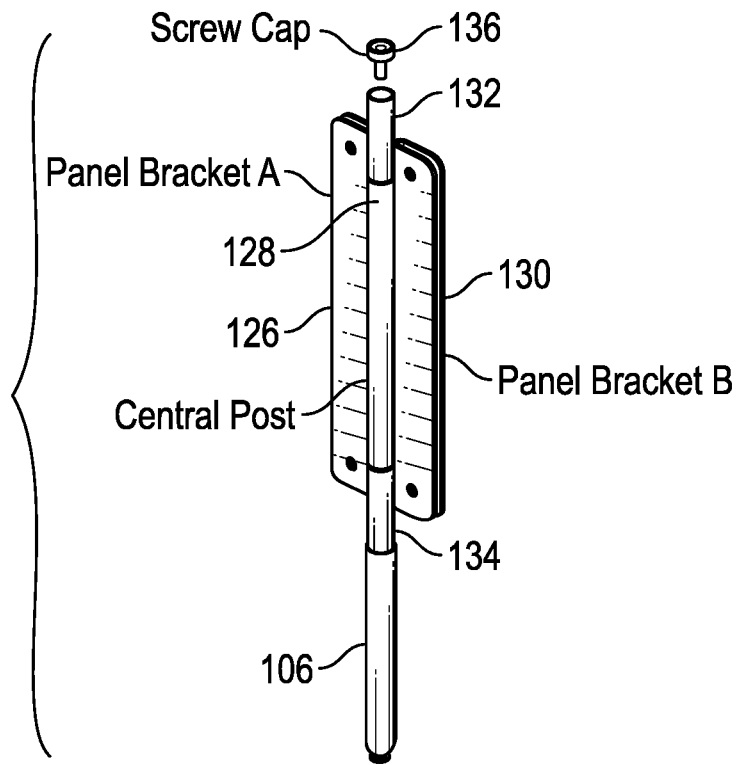

FIG. 11 depicts the first rotation member, the second rotation member and the post 106 as an assembled butterfly hinge ready to receive a fastener 136. The lower tube 134, middle tube 128 and upper tube 132 are assembled onto the post 106, and freely rotatable about the post 106. The bracket 126 and the bracket 130 are in open 180° arrangement (as in FIG. 10), and ready to receive screens. It should be appreciated that screens may be assembled to the brackets 126, 130, prior to assembling the first rotation member, the second rotation member and the post 106, in a variation assembly procedure.

Figure 12:
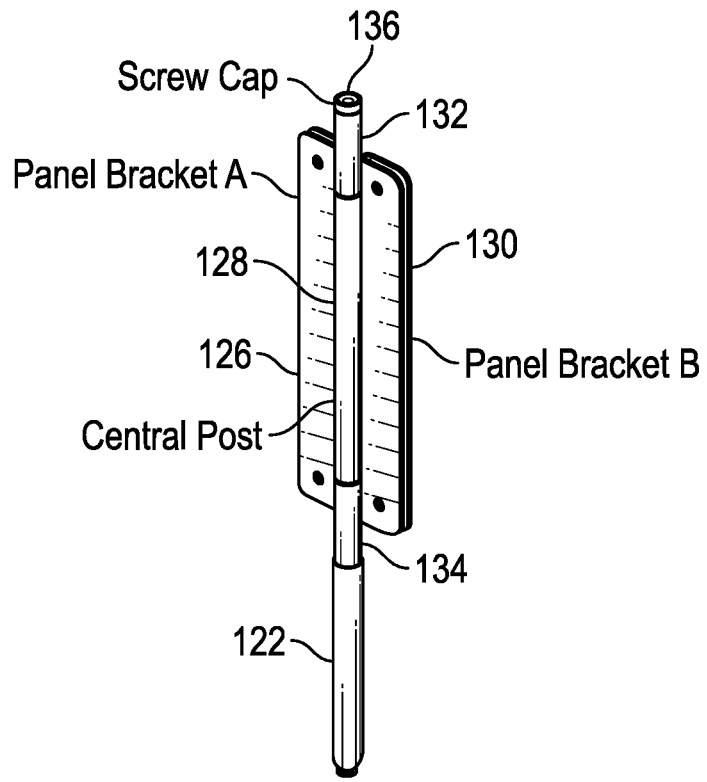

FIG. 12 depicts the assembled butterfly hinge, with the fastener 136 securing the first rotation member and the second rotation member to the post. Variations of the butterfly hinge could have further numbers of rotation members for further numbers of screens. Variations of the butterfly hinge could have a shorter or longer post, attachments to the post, other styles or types of brackets, other types of hinges, etc.

Figure 13:
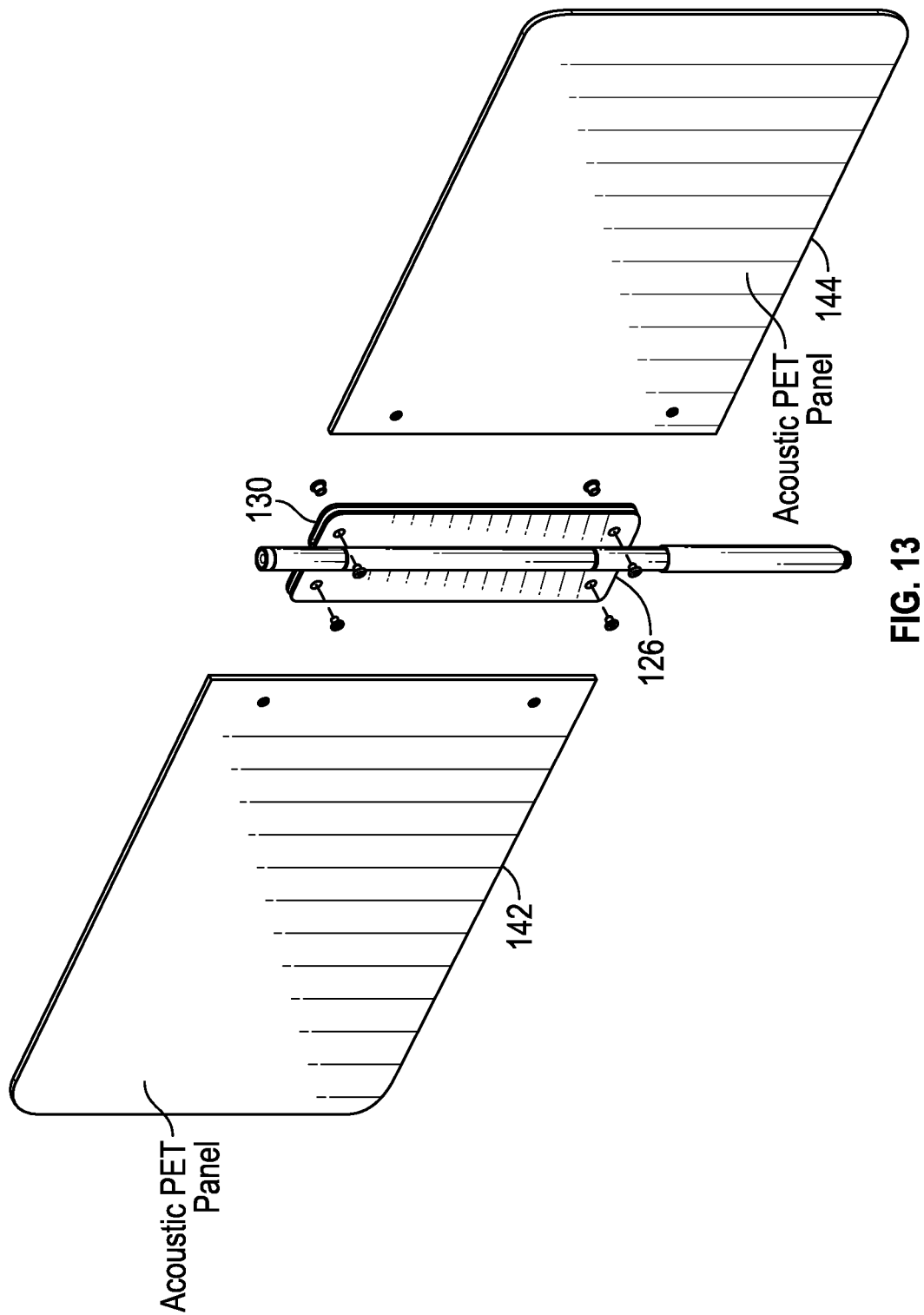

FIG. 13 depicts the assembled butterfly hinge ready to receive a first screen 142 and a second screen 144. The first screen 142 assembles to the bracket 126 of the first rotation member. The second screen 144 assembles to the bracket 130 of the second rotation member. In one embodiment, as depicted in FIG. 13, each screen 142, 144 includes an acoustic PET (polyethylene terephthalate) panel. Other acoustic damping materials could be used for screens in further embodiments, as could other screen materials in general. One further embodiment has one or more whiteboards. For example a screen could have a whiteboard on one face, whiteboards on opposed faces, or multiple whiteboards on one or both faces, etc. More than one screen could have one or more whiteboards, in variations. The above variations apply to further embodiments of butterfly divider screens.

Figure 14:
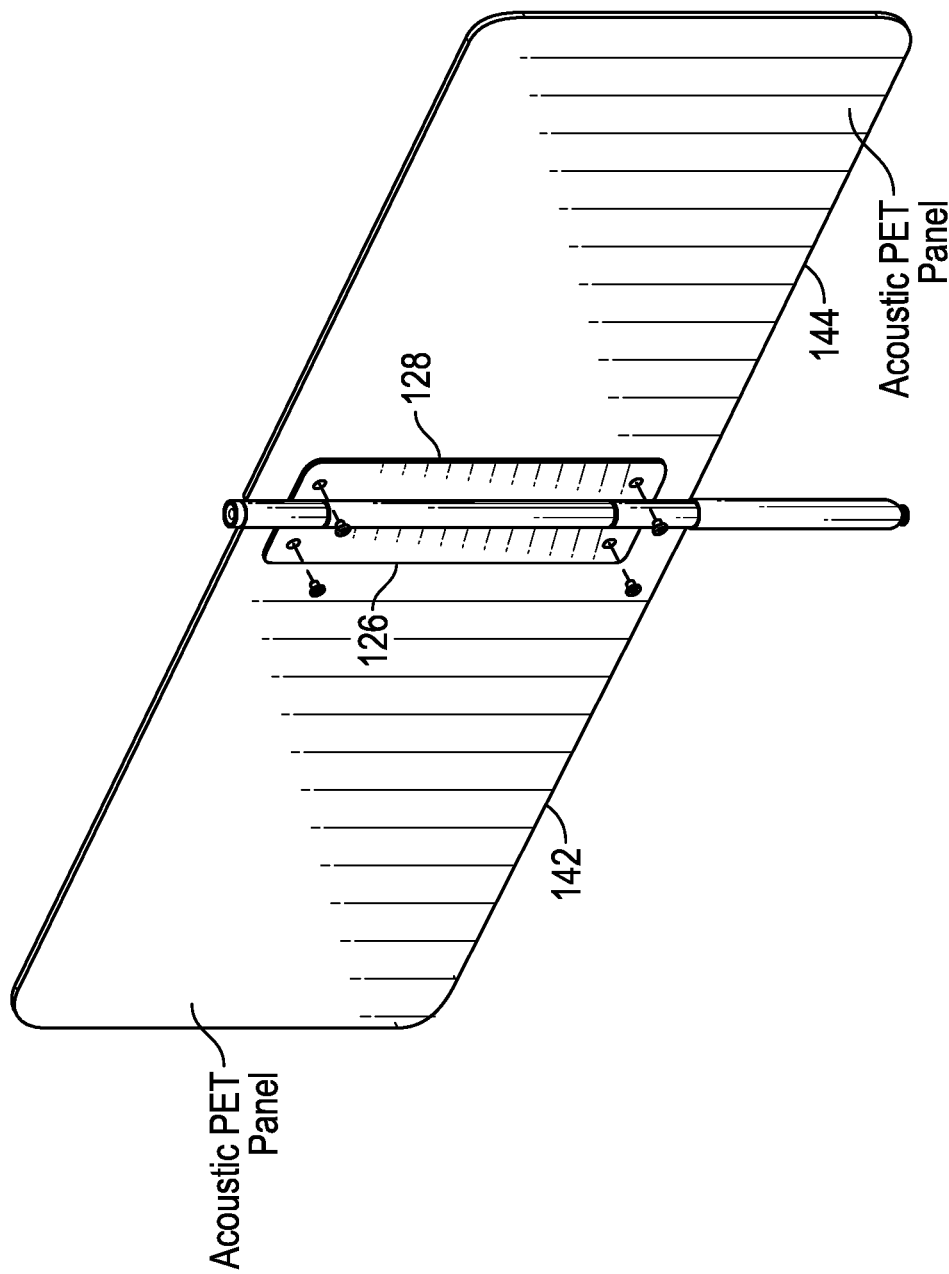

FIG. 14 depicts the screens 142, 144 assembled to the butterfly hinge, ready to receive fasteners. The fasteners secure the screens 142, 144 to the respective brackets 126, 130, and could include nuts and bolts (optionally with washers), screws, nails, or alternatively adhesive, staples, a clamp, etc., and further fasteners are readily devised.

Figure 15:
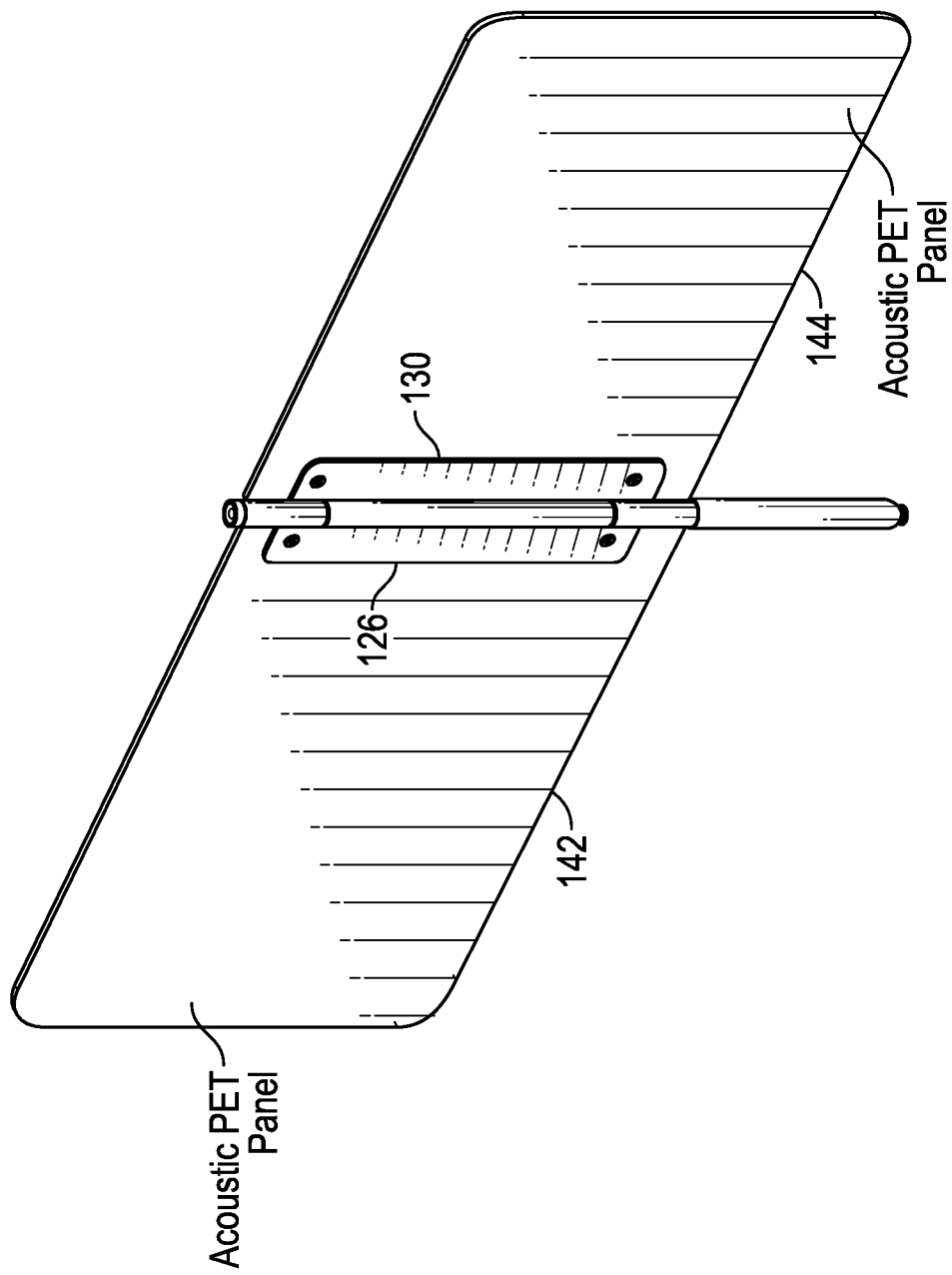

FIG. 15 depicts one embodiment of an assembled butterfly divider screen. The screens 142, 144 are shown in an open 180° arrangement. One screen 142 is assembled to the bracket 126 of the first rotation member, forming a screen member. The other screen 144 is assembled to the bracket 130 of the second rotation member, forming a further screen member.

Figure 16:
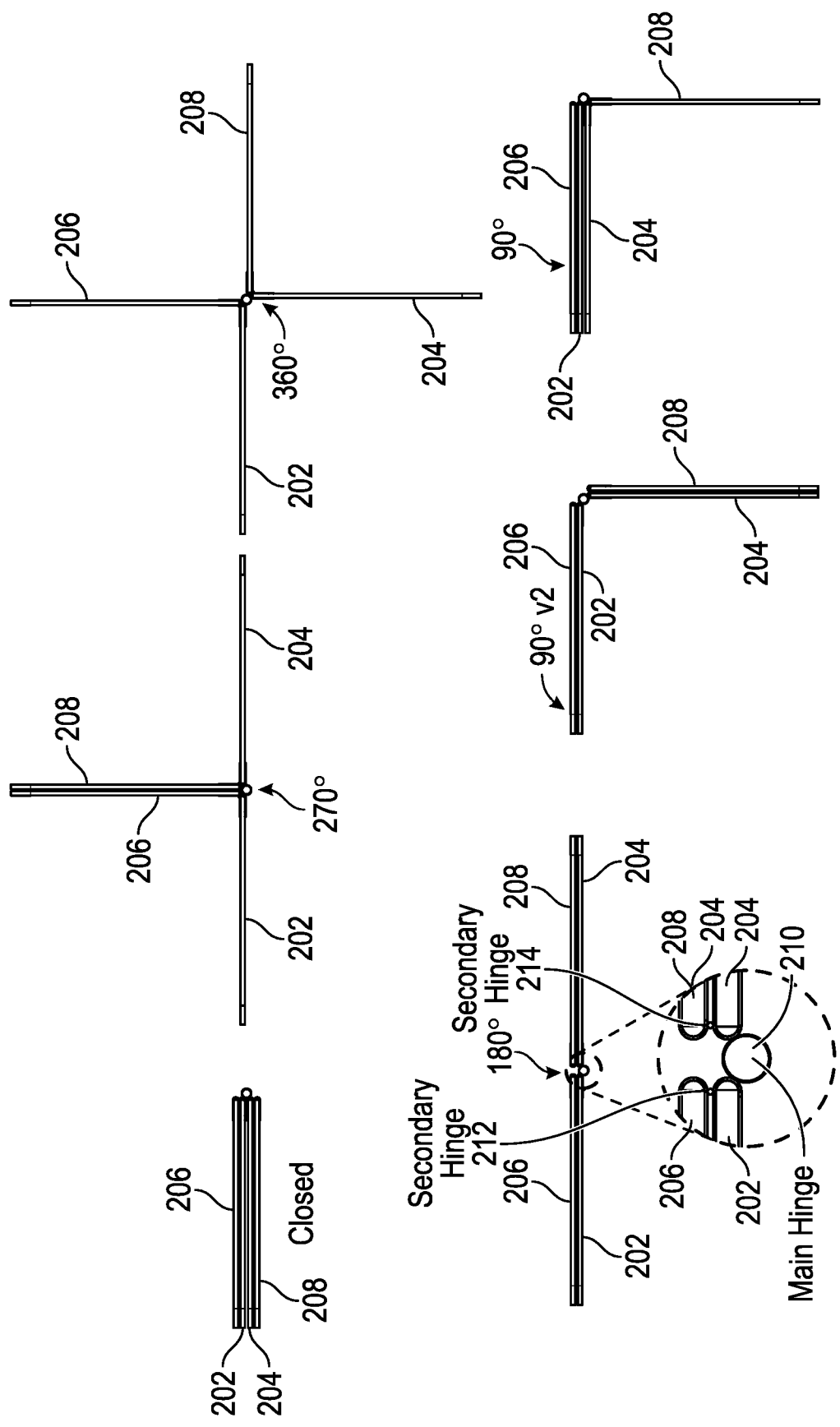

FIG. 16 depicts an embodiment of a butterfly divider screen that has four screens 202, 204, 206, 208, a main hinge 210 and two secondary hinges 214. At the bottom left in FIG. 16, there is an arrangement of two screens 202, 206 together in 180° opposition across the center post and main hinge 210 to two screens 204, 208. It should be observed that the two screens 202, 204 and associated brackets of the respective rotation members forming the main hinge 210 are offset in a lateral direction from a centerline axis of the post and centerline rotation axis of the main hinge 210 and respective rotation members. Such offset accommodates folding all screens together in the closed 0° arrangement depicted at the top left of FIG. 16. It should be further observed that the two screens 206, 208 and associated brackets and secondary hinges 212 are further offset in a lateral direction from the centerline axis of the post and the centerline rotation axis of the main hinge 210 and respective rotation members. Such further offset further accommodates the folding together of all four screens 206, 202, 204, 208, in order, as depicted at the top left in FIG. 16. The secondary hinges 212 are positioned to allow free movement opening and closing the screens 206, 208 relative to the screens 202, 204 that rotate with operation of the main hinge 210.

Continuing at the bottom of FIG. 16, in the middle and right are depicted differing open 90° orthogonal arrangements of screens that are supported by the main hinge 210, secondary hinges 214 and respective offsets that accommodate finite thickness of screens and brackets for purposes of folding and screen movement. In the middle bottom of FIG. 16, two screens 206, 204 are closed together and at right angle, 90°, or orthogonal to two more screens 204, 208 that are closed together. At the bottom right, three screens 206, 202, 204 are closed together and at right angle, 90° or orthogonal to one screen 208. Several further open 90° arrangements are possible with these screens and hinges in this embodiment.

Continuing at the top of FIG. 16, in the middle is an open, T-shaped position or arrangement of screens. Two screens 206, 208 are together, and at right angles, 90° or orthogonal to each of the two screens 202, 204, which are in opposed 180° arrangement to each other. In the T-shaped position, the two screens 206, 208 that are closed together form the stem of the "T", and the remaining two screens 202, 204 are as the arms of the "T". Several further T-shaped positions or arrangement of screens are possible with these screens and hinges in this embodiment, for example each of the screens 202, 206, 208, 204 could act as the stem of the "T" while remaining screens act as the arms of the "T" in groups of one or two screens.

To the top right in FIG. 16, the four screens 202, 206, 208, 204 are in open, symmetric, 90° or orthogonal arrangement. It should be appreciated that all of these screen arrangements are rotatable about the post, in a complete circle, as a feature of operation of the main hinge 210.

FIG. 17 depicts the four screen butterfly divider screen of FIG. 16 in a folded, zero degree position or arrangement. At the top left is a top view showing the screens 206, 202, 204, 208, in order, all folded together or closed. At the top right in FIG. 17 is a perspective view, with one of the screens 208 visible in entirety. At the bottom right, a side projected view shows all of the screens are flat and parallel to each other, which is possible despite finite thickness of the screens, because of the offsets in the hinges, brackets and screens. At the bottom left, a front view shows the compact nature of the folded, closed screen which facilitates both storage and deployment.

Figure 18:
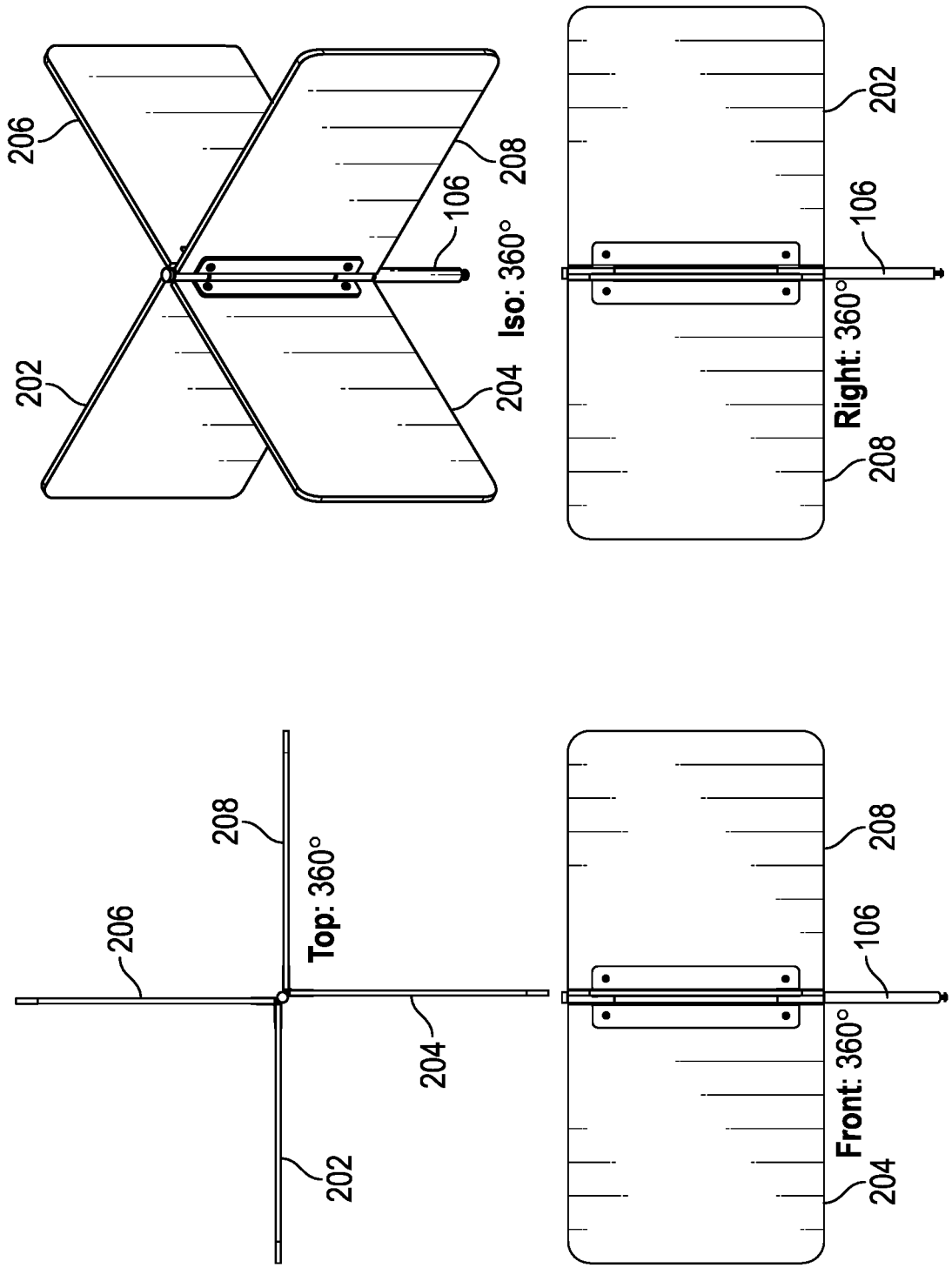

FIG. 18 depicts the four screen butterfly divider screen of FIG. 16 in an open, four-screen symmetric ninety degree or orthogonal position or arrangement. The screens can be deployed in various orders. For example, two screens 202, 206 together can be rotated into position relative to the post 106, then the screen 206 folded out from the screen 202, or vice versa. Similarly, two screens 204, 208 can be rotated into position relative to the post 106, then the screen 208 folded out the screen 204, or vice versa. Or one screen at a time can be started into rotation, for example starting with screen 206, then screen 202, followed by screen 204 and finally screen 208, or vice versa.

Figure 19:
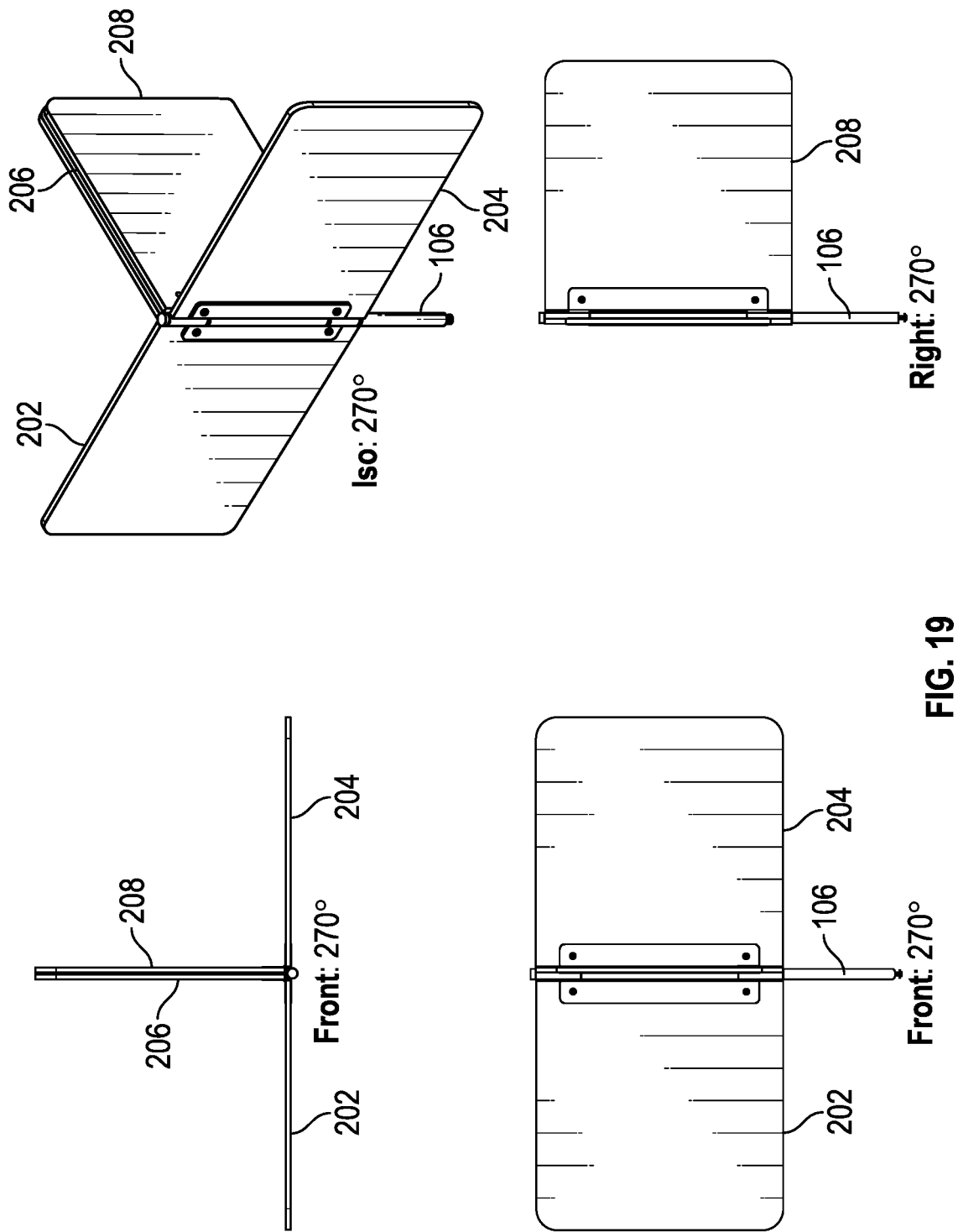

FIG. 19 depicts the four screen butterfly divider screen of FIG. 16 in an open, T-shaped position or arrangement. Screen 202 is 180° opposed to screen 204, with the post in the center. Screens 206, 208 are closed together and orthogonal to the plane formed by the screens 202, 204.

Figure 20:
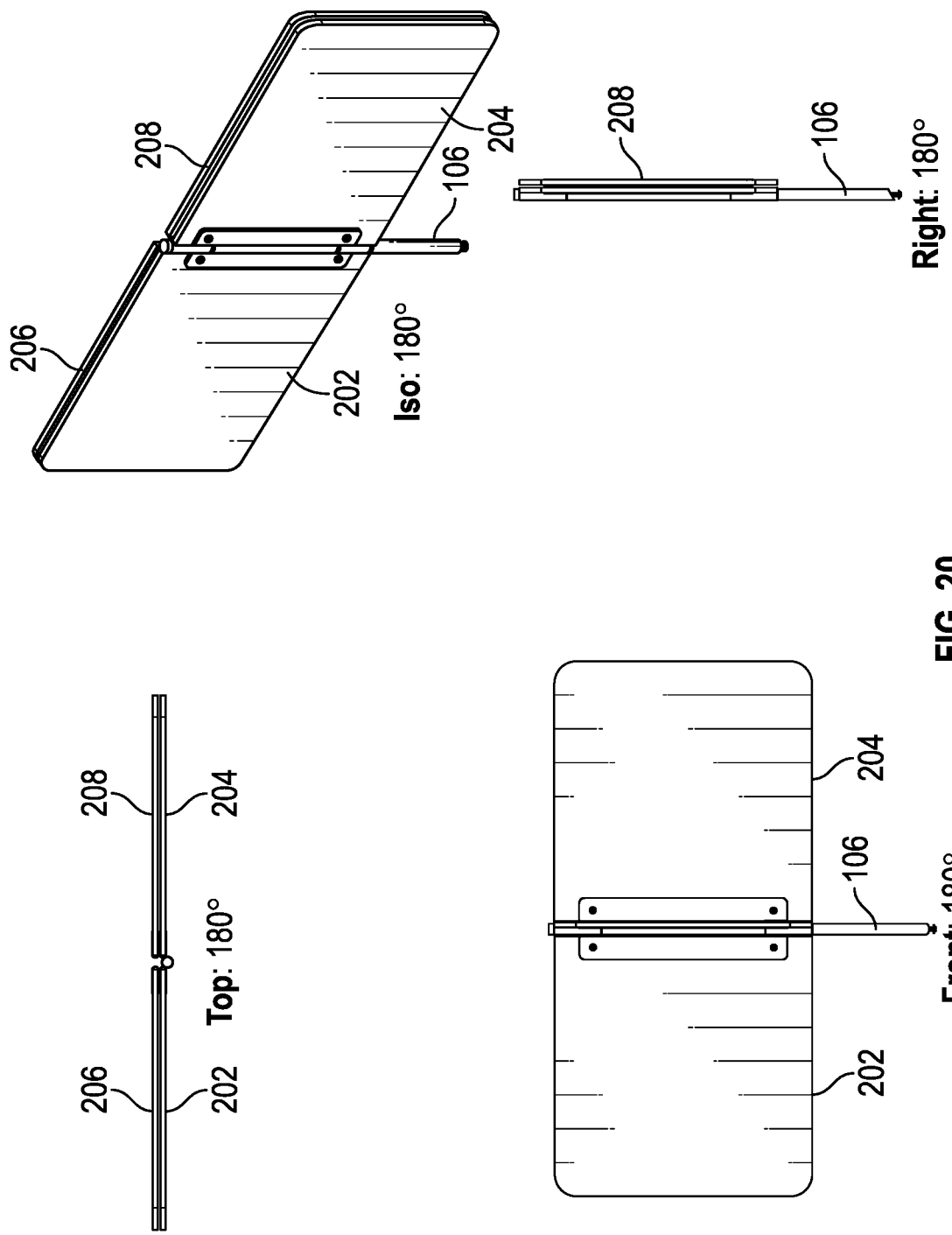

FIG. 20 depicts the four screen butterfly divider screen of FIG. 16 in an open, one hundred and eighty degree position or arrangement. In this arrangement, two screens 202, 206 are closed together, courtesy of the secondary hinge 212 connecting the two screens 202, 206 (see FIG. 16). Two more screens 204, 208 are closed together, courtesy of the other secondary hinge 214 connecting the two screens 204, 208. The one set of two screens 204, 206 is 180° opposed to the other set of two screens 204, 208. Further open, 180° positions or arrangements are possible, for example with three screens 204, 202, 206 closed together and one screen 208 opened out to 180° in opposition, or three screens 204, 208, 206 closed together and one screen 202 opened out to 180° in opposition.

Figure 21:
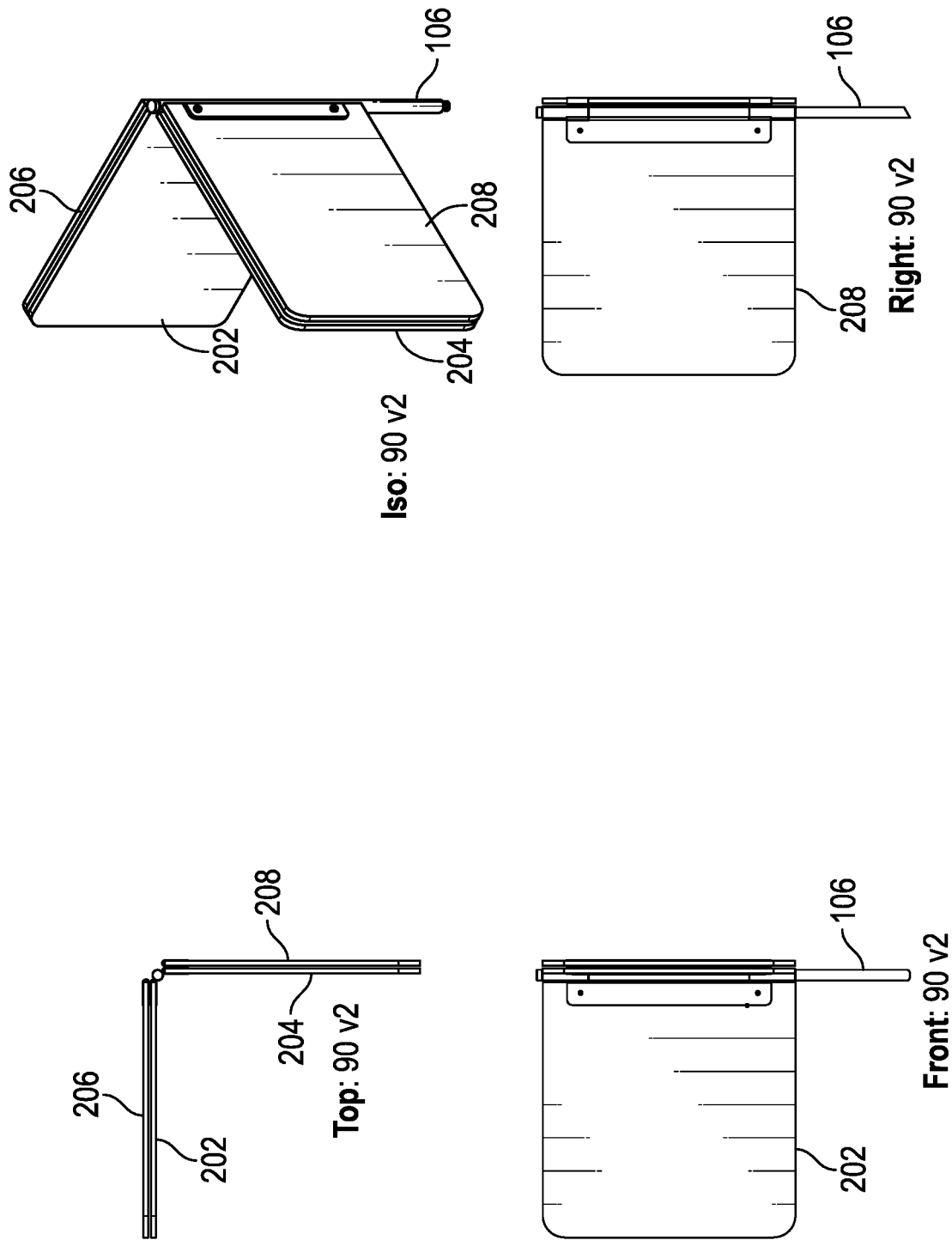

FIG. 21 depicts the four screen butterfly divider screen of FIG. 16 in an open, two-screen ninety degree or orthogonal position or arrangement. Two screens 202, 206 are closed together, sharing a secondary hinge 212 along one edge each. Two more screens 204, 208 are closed together, sharing the other secondary hinge 214 along one edge each. The one set of two screens 202, 206 is opened 90° or orthogonal to the other set of two screens 204, 208, thus resembling a two screen set up with two orthogonal screens. The four screens 206, 202, 204, 208 in such (and other) arrangement can be rotated to any position about the central post 106, in this embodiment, as a feature of the rotation capability of the main hinge 210. Further open, 90° or orthogonal positions or arrangements are possible, for example with three screens 204, 202, 206 closed together and one screen 208 opened out to 90° or orthogonal arrangement, or three screens 204, 208, 206 closed together and one screen 202 opened out to 90° or orthogonal arrangement.

Figure 22:
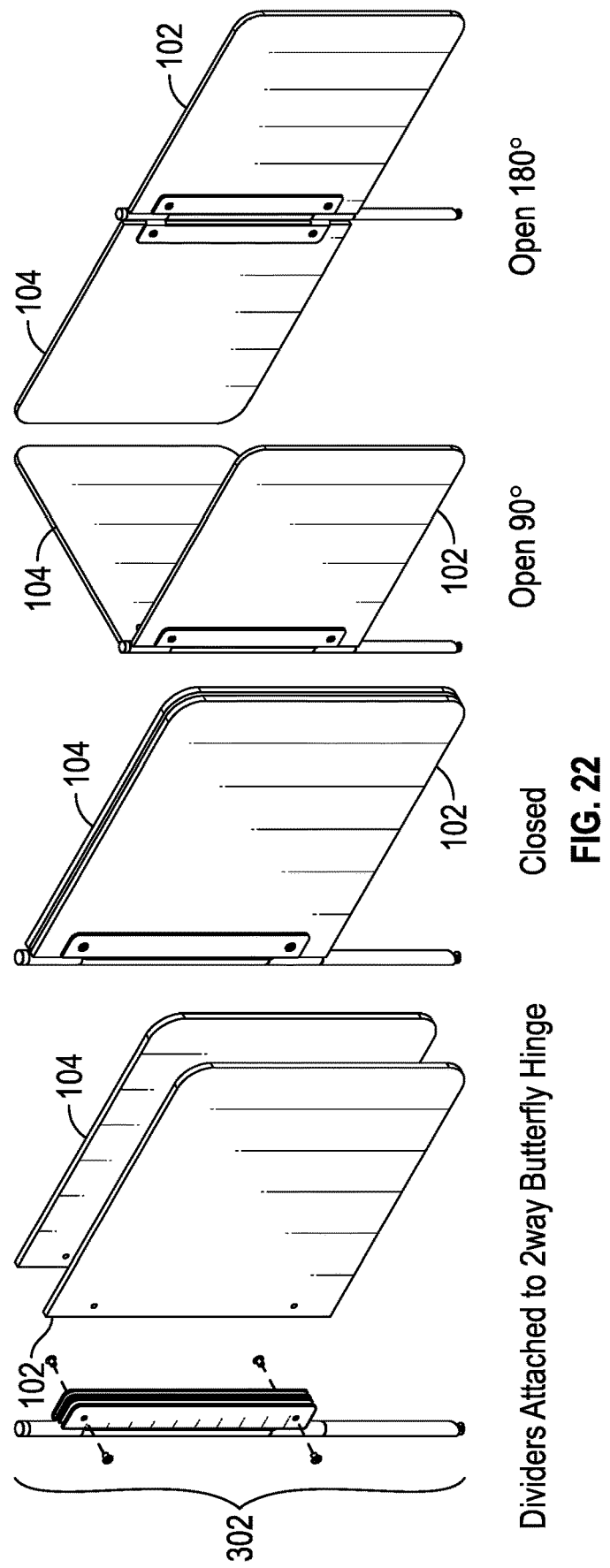

FIG. 22 sets forth an embodiment of a two screen butterfly divider screen based on FIGS. 1-15, showing multiple positions or arrangements. Dividers, namely screens of screen members 102 and 104, are attached to the two-way butterfly hinge 302, which can be embodied as described above or below, or in variations. The screens and screen members 102, 104 are shown in closed arrangement, open 90° arrangement and open 180° arrangement.

Figure 23:
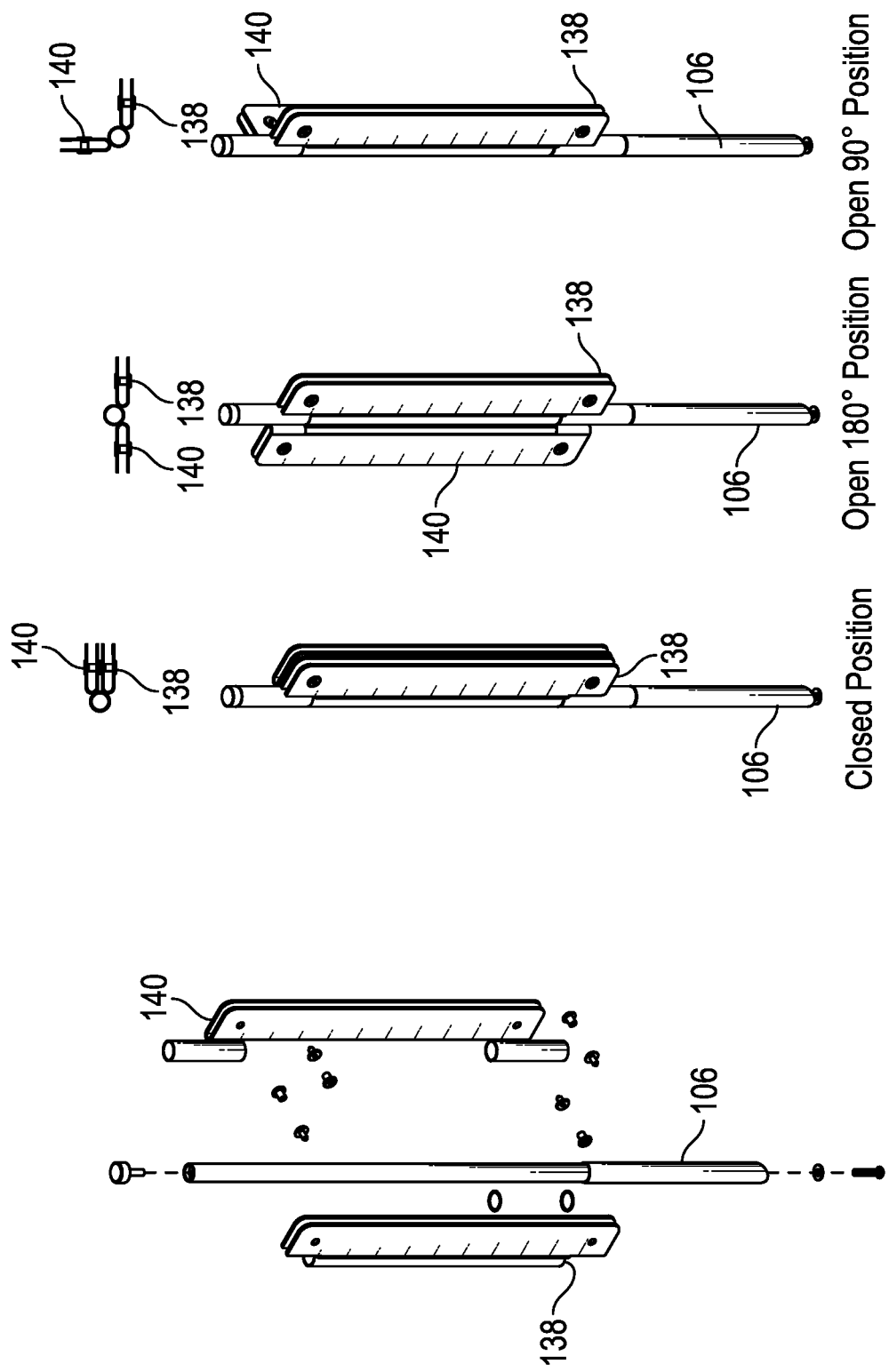

FIG. 23 illustrates an exploded view and assembled views in multiple positions or arrangements of the butterfly hinge of FIG. 22. To the left in FIG. 23, the first rotation member 138, the second rotation member 140, the post 106 and various fasteners are shown ready for assembly. Second from the left, the assembled butterfly hinge is shown in closed position, and above in top view. The screen and bracket offsets from the axis of rotation of the rotation member, to accommodate finite thickness of the screens in the closed position, are clearly visible for both rotation members 138, 140. Second from the right, the assembled butterfly hinge is shown in an open 180° position. The offsets of the brackets of the rotation members 138, 140, relative to the axis of rotation of the rotation members 138, 140, results in positioning the post slightly above or off-center relative to the center plane of the two brackets (and associated screens), in the drawing. On the right, the assembled butterfly hinge is shown in open 90° position.

Figure 24:
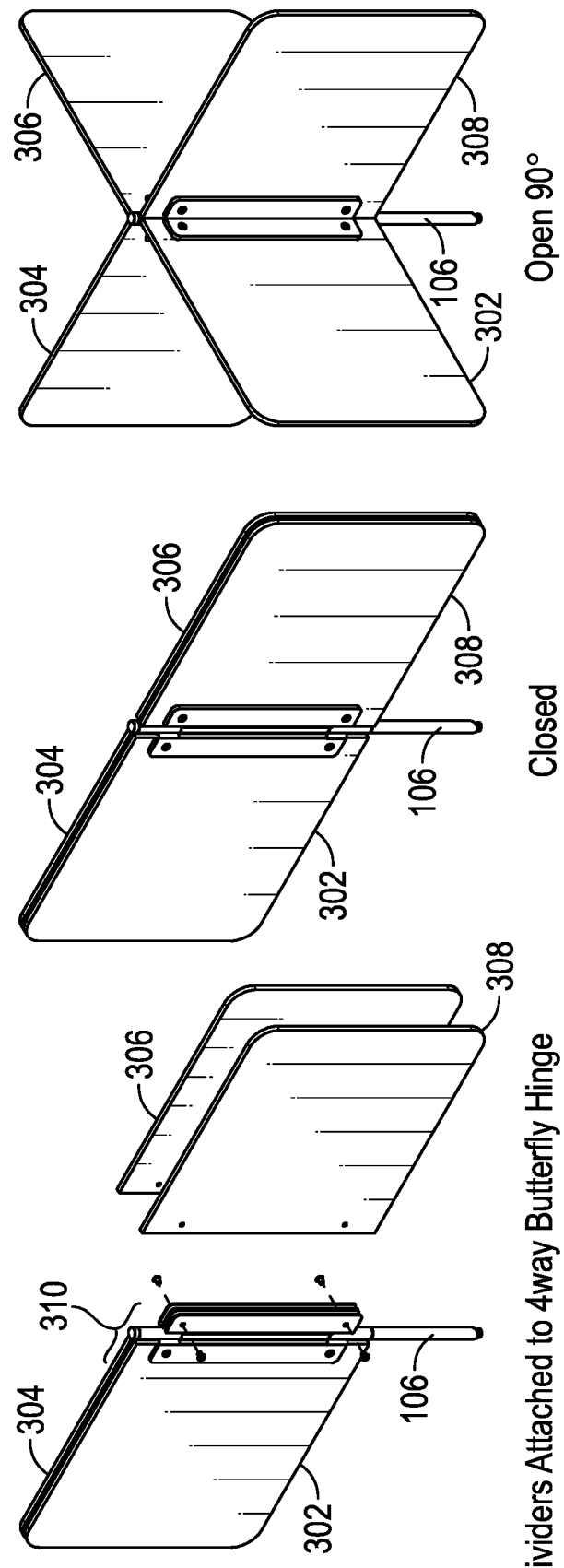

FIG. 24 depicts a further embodiment of a four screen butterfly divider screen, with screens or dividers attached to a four-way butterfly hinge, in multiple positions or arrangements. Differing from the embodiment(s) in FIGS. 16-21, the four-way butterfly hinge arranges four screens 302, 304, 306, 308 with always two screens 304, 308 in mutual 180° opposition about the post 106, at various angles to two more screens 302, 306 that are always in mutual 180° opposition about the post 106. There are no secondary hinges in this embodiment, although further embodiments could employ such.

At the left in FIG. 24, the four-way butterfly hinge is shown in closed arrangement, with two screens 302, 304 assembled to the four-way butterfly hinge, and awaiting assembly of two more screens 308, 306. In the center of FIG. 24, the four-way butterfly hinge is shown fully assembled, in closed arrangement. Two screens 302, 304 are closed together, two more screens 306, 308 are also closed together. The 180° angle between screens 304, 308 of one screen member, and the 180° angle between screens 302, 306 of the other screen member, does not vary in this embodiment. To the right in FIG. 24, the four-way butterfly screen is shown with the four-way butterfly hinge open to 90°, and the four screens 302, 304, 306, 308 in open, symmetric, 90° or orthogonal arrangement.

Figure 25:
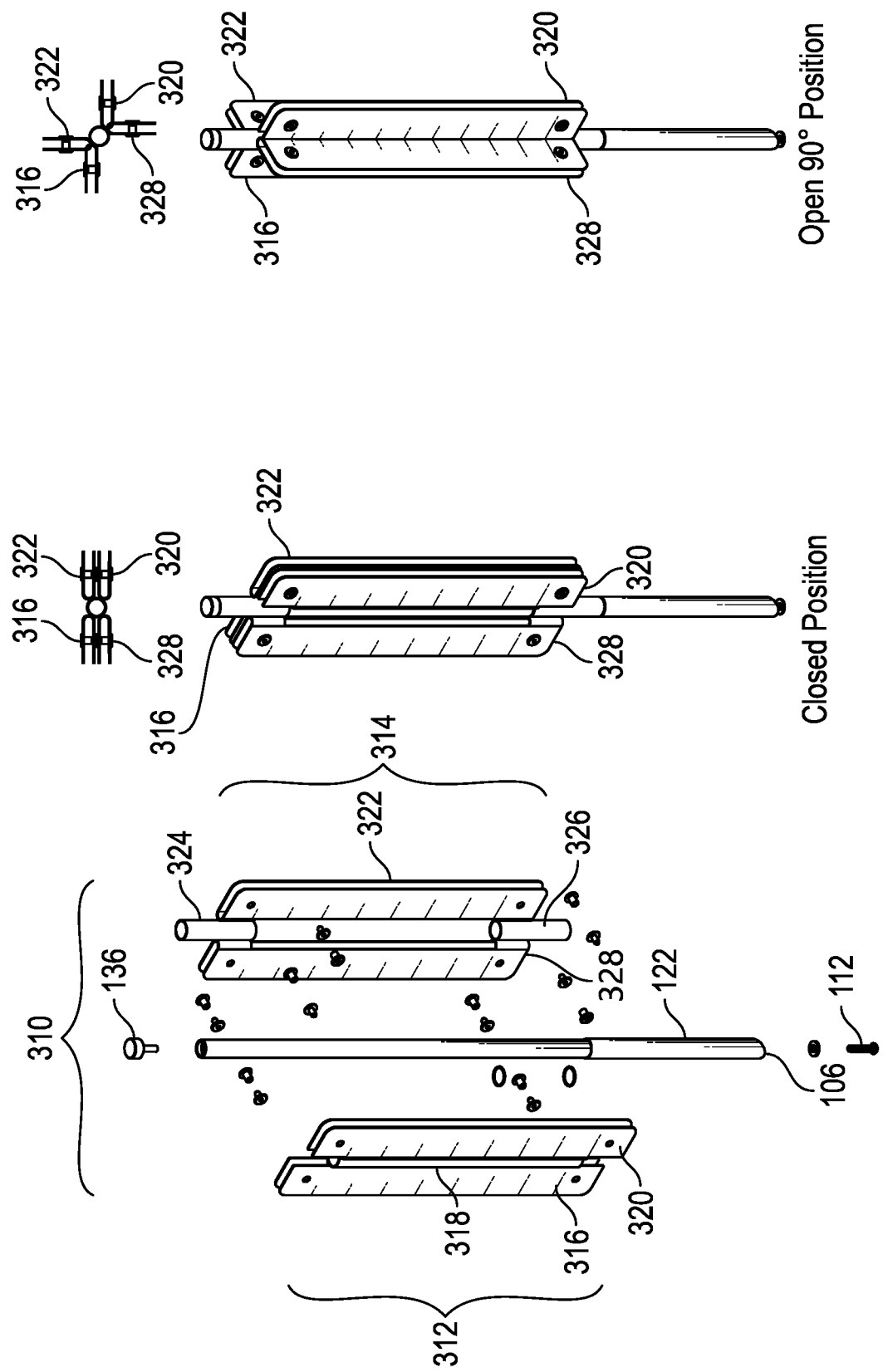

FIG. 25 illustrates an exploded view and assembled views of the four-way butterfly hinge of FIGS. 23 and 24 in multiple positions or arrangements. A first rotation member 312 of the four-way butterfly hinge has two brackets 316, 320 attached in opposition with offsets to a middle tube 318, and could be implemented by modifying the first rotation member 138 (see FIG. 9) through the addition of one bracket 320 with appropriate offset. A second rotation member 314 of the four-way butterfly hinge has two brackets 328, 322 attached in opposition with offsets to a lower tube 326 and an upper two 324, and could be implemented by modifying the second rotation member 140 (see FIG. 9) through the addition of one bracket 328 with appropriate offset. Each rotation member 312, 314 receives and holds respective two screens in parallel opposed arrangement to each other (except for the offsets) and rotatable about the post 106. For example, it can be considered that one rotation member 312 with screens 308, 304 in parallel opposed arrangement to each other forms one screen member, and the other rotation member 314 with screens 306, 302 in parallel opposed arrangement to each other forms another screen member (see FIGS. 24 and 25). The two screen members can be arranged in a closed position, and can also be arranged orthogonal to each other, and in various further positions and relative angles. Fasteners 112, 136 attach to the post 106 as previously described, to retain the rotation members and fasten the post to a support in various embodiments.

To the center in FIG. 25, the four-way butterfly hinge is shown in closed position, with offsets from the centerline axis of rotation for the rotation members 312, 322 clearly visible for the respective brackets in the top view. For example, one bracket 320 of the first rotation member 312 is offset in a lateral, downward direction in the drawing, and the other bracket 316 of the first rotation member 312 is offset in a lateral, upward direction in the drawing. One bracket 322 of the second rotation member 314 is offset in a lateral, upward direction and the drawing. The other bracket 328 of the second rotation member 314 is offset in a lateral, downward direction in the drawing. Rotation of the respective rotation members 312, 322 about the central axis of the post 106 gives a scissors-like action to opening the screens, i.e., opening one screen member relative to another screen member to an open position (see FIG. 24), and closing the screens (and screen members) together to the closed position.

To the right in FIG. 25, the four-way butterfly hinge is shown in the open 90° position. One bracket 322 is opened from another bracket 320, causing the one bracket 328 to open from the other bracket 316, or vice versa.

Figure 26:
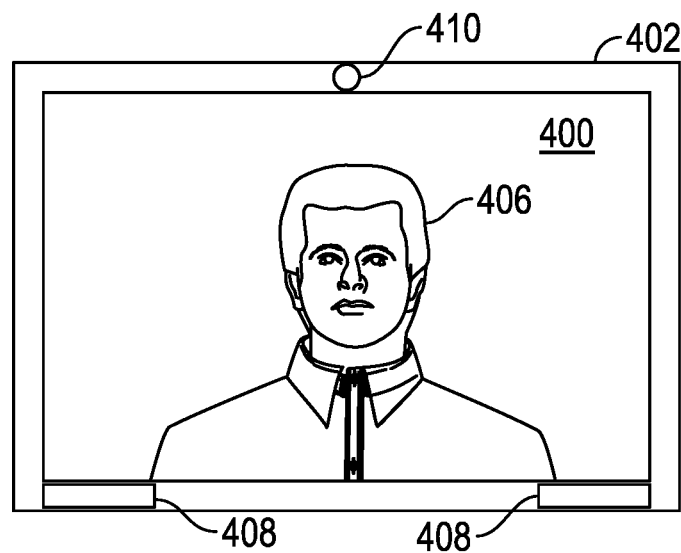

FIG. 26 depicts a screen 402 that has a monitor 404, suitable for embodiments of butterfly divider screens. The monitor 404 could also have one or more speakers 408, a camera 410, etc., or be a touchscreen. For example, the monitor 404 could be used for Internet access, media presentations, background imagery, entertainment, or videoconferences and show an image of a participant 406, etc. In embodiments, the screen 402 may include one or more monitor couplings that may be used to couple the monitor to the screen 402. For example, the screen 402 may include a monitor mount that may be used to couple the monitor 404 to the screen 402. In some embodiments, the monitor coupling may include one or more extendable arms and/or rotatable hinges to enable the monitor 404 to be positioned in different positions and/or orientations. In a butterfly divider screen embodiment, one face of one screen, two opposed faces of one screen, one or two faces of multiple screens, etc., could each have a monitor, or more than one monitor. Electrical power for the monitor could be provided through the beam 108 (see FIG. 5), in various embodiments.

Figure 27:
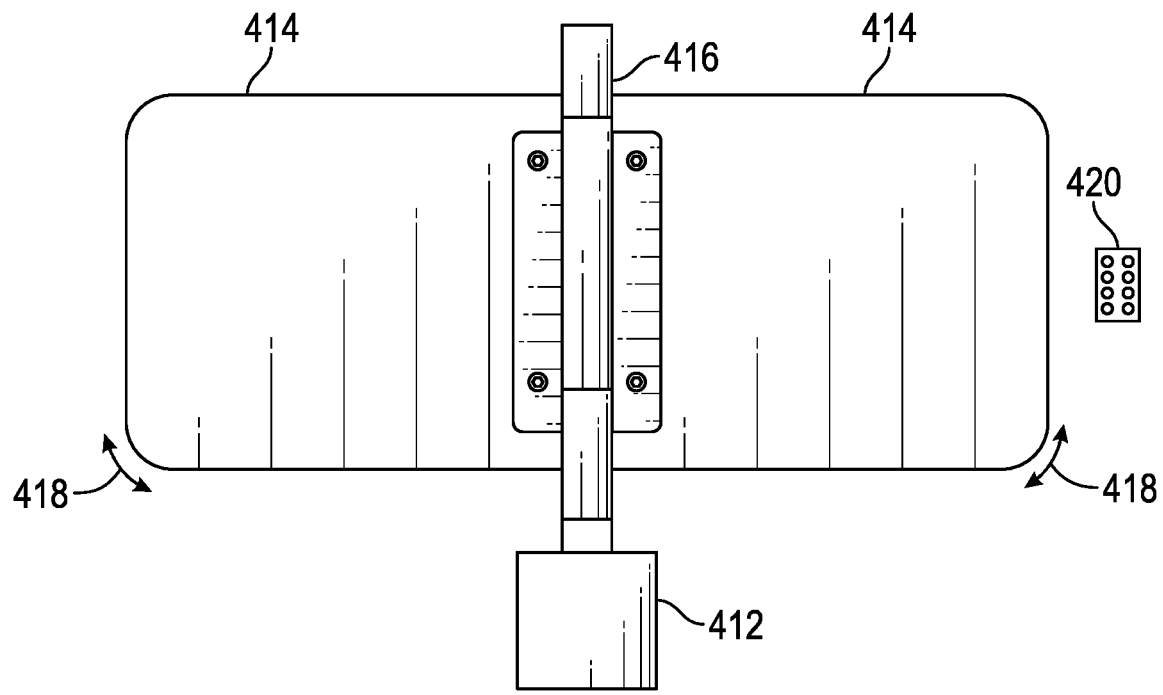

FIG. 27 depicts an embodiment of a butterfly divider screen with a motor 412 or actuator that is coupled to move screen members 414. The motor 412 or actuator could be activated or directed by a local control interface, or by a remote control 420, for example a handheld device or a smart phone, in some embodiments. Gearing, levers, and other mechanisms for coupling to and operating the screen members 414, to rotate one or more screen members 414 about the post 416 are readily devised by those skilled in the art. For example, a motor 412 or actuator, which could be motor driven or hydraulic for example, could be coupled to one or more screen members 414 through geared or lever actuated rotation of rotation members or mechanical coupling to the screen(s). The motor 412 or actuator moves the screen member(s) 414 as indicated by the double-headed motion arrows 418 in the drawing. Electrical power for a motor 412 or actuator could be provided through an electrical cord, batteries, or in one embodiment through electrical power routing in the beam 108 (see FIG. 5). A local control interface for example could be attached to the post 416 or the motor 412, or connected by wire, and could include buttons, switches, rotatable knobs, sliders, a touchpad, voice control or gesture control, etc. A remote control interface could be similarly implemented as to control input, and coupled to the motor 412 or actuator through infrared or wireless module(s). User interfaces for such operation are readily devised in keeping with the teachings herein.

The foregoing detailed description refers to the accompanying drawings. In the foregoing description and drawings, for purposes of explanation and not limitation, specific details are set forth such as particular structures, architectures, interfaces, techniques, etc. in order to provide a thorough understanding of the various aspects of the claimed disclosure. However, various aspects of the disclosed embodiments may be practiced in other examples that depart from these specific details, provided that the original design intent and functional goal of the device remains intact. In certain instances, descriptions of well-known devices and methods are omitted so as not to obscure the description of the present disclosure with unnecessary detail.

Furthermore, while the present embodiments described herein reference components of particular shapes, the embodiments described herein relate to any shape components (e.g., round, square, rectangular, rounded edges and/or corners etc.).

The various components of the system described herein may comprise various construction materials. For example, the components may be constructed from injection mold plastic, 3-D printed plastic, wood, fiberglass, metal, cardboard, foam, etc. Various coatings and/or coverings such as felt, velvet, rubberized paint, plastic, glass, foam, etc., may be applied to a base construction material. Furthermore, any fastener, hinge, and/or fitting type may be used in place of the fasteners, hinges, and fittings illustrated herein for convenience.

In the description herein, numerous specific details are set forth, such as examples of specific hardware structures, specific architectural and micro architectural details, specific components, specific measurements/heights, etc. in order to provide a thorough understanding of the present disclosure. It will be apparent, however, that these specific details need not be employed to practice the present disclosure. In other instances, well known components or methods, such as specific and alternative construction materials, dimensions, shapes, sizes, functions and other specific details of the system described herein have not been described in detail in order to avoid unnecessarily obscuring the present disclosure.

Use of the phrases "to," "capable of/to," "operable to," etc. in one implementation, refers to some apparatus, system, component, member, and/or element designed in such a way to enable use of the apparatus, system, component, member, and/or element in a specified manner. Note as above that use of "to," "capable of/to," "operable to," etc. in one implementation, refers to the latent state of an apparatus where the apparatus is not operating but is designed in such a manner to enable use of an apparatus in a specified manner.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" on "in some embodiment" in various places throughout this specification are not necessarily all referring to the same embodiment. Furthermore, the particular features, structures, or characteristics may be combined in any suitable manner in one or more embodiment.

In the foregoing specification, a detailed description has been given with reference to specific exemplary implementations. It will, however, be evident that various modifications and changes may be made thereto without departing from the broader spirit and scope of the disclosure. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such. Also, the terms "first, " "second," "third," "fourth," etc. as used herein are meant as labels to distinguish among different elements and may not necessarily have an ordinal meaning according to their numerical designation.

What is claimed is:

1. A divider screen, comprising:
 a post;
 a first screen member comprising a first screen attached to a first rotation member that is rotatably attached to the post with the first screen member rotatable about the post;
 a second screen member comprising a second screen attached to a second rotation member that is rotatably attached to the post with the second screen member rotatable about the post;
 the first and second screen members arrangeable in at least a closed zero degree position, an open ninety degree position, and an open one hundred eighty degree position;
 a third screen member comprising a third screen connected by a first secondary hinge to the first screen;
 a fourth screen member comprising a fourth screen connected by a second secondary hinge to the second screen; and
 the third, first, second and fourth screen members arrangeable in at least:
  a further closed zero degree position having the third, first, second and fourth screen members closed together;

a plurality of further open ninety degree positions each having two or more such screens closed together and one or more such screens opened orthogonal to the two or more such screens closed together;

an open orthogonal position having the third, first, second and fourth screen members in symmetric orthogonal arrangement; and an open T position having the first and second screens closed together as a stem of the T and the third and fourth screen members apart as arms of the T.

2. The divider screen of claim 1, wherein:

the post comprises a lower, first post section having a first diameter, and a second post section having a second, narrower diameter;

the first rotation member comprises a first tube or u-shaped cross section member that rotatably fits the second post section; and the second rotation member comprises two second tubes or u-shaped cross section elongated members that rotatably fit the second post section adjacent to opposed ends of the first rotation member.

3. The divider screen of claim 1, wherein each of the first rotation member and the second rotation member comprises a hinge.

4. The divider screen of claim 1, further comprising a base having the post attached thereto.

5. The divider screen of claim 1, further comprising:

a motor or actuator coupled to operate the first and second screen members.

6. The divider screen of claim 1, wherein the first screen or the second screen comprises sound damping acoustic material.

7. The divider screen of claim 1, wherein the first screen or the second screen comprises a whiteboard.

8. The divider screen of claim 1, wherein the first screen or the second screen comprises a monitor or a touchscreen.

9. The divider screen of claim 1, further comprising:

a positionable beam having the post attached thereto and having electrical connectivity.

10. The divider screen of claim 1, wherein the first and second screen members mutually arrangeable in the closed zero degree position comprises:

the first screen laterally offset from an axis of the first rotation member; and the second screen laterally offset from an axis of the second rotation member.

11. A divider screen, comprising:

a post;

a first screen member comprising a first screen, a second screen and a first rotation member, the first and second screens attached to the first rotation member that is rotatably attached to the post such that the first screen and the second screen in opposed parallel arrangement to each other are rotatable about the post;

a second screen member comprising a third screen, a fourth screen and a second rotation member, the third and fourth screens attached to the second rotation member that is rotatably attached to the post such that the third screen and the fourth screen in opposed parallel arrangement to each other are rotatable about the post; and the first and second screen members arrangeable in at least a closed zero degree position having the first and third screens in closed together parallel arrangement and the second and fourth screens in closed together parallel arrangement, and an open ninety degree position having the first, third, second and fourth screens in symmetric, orthogonal arrangement with the first screen member and the second screen member orthogonal to each other.

12. The divider screen of claim 11, further comprising:

a motor or actuator coupled to operate the first and second screen members.

13. The divider screen of claim 11, wherein the first and second screen members arrangeable in the closed zero degree position comprises:

the first screen laterally offset from an axis of the first rotation member;

the second screen laterally offset from the axis of the first rotation member;

the third screen laterally offset from an axis of the second rotation member; and the fourth screen laterally offset from the axis of the second rotation member.

14. The divider screen of claim 11, wherein one or more of the first, second, third or fourth screens comprises a sound damping acoustic material, a whiteboard, a monitor or a touchscreen.

* * * * *